US008834163B2

(12) United States Patent
Pollak et al.

(10) Patent No.: US 8,834,163 B2
(45) Date of Patent: Sep. 16, 2014

(54) PHYSICS-BASED SIMULATION OF WARHEAD AND DIRECTED ENERGY WEAPONS

(75) Inventors: Eytan Pollak, Ovedo, FL (US); Jack Charles Wells, II, Dade City, FL (US); Merrill Lay, Daytona Beach, FL (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 13/306,914

(22) Filed: Nov. 29, 2011

(65) Prior Publication Data

US 2013/0137066 A1 May 30, 2013

(51) Int. Cl.
G06G 7/72 (2006.01)

(52) U.S. Cl.
USPC .................. 434/14; 434/11; 434/12; 434/13; 434/15; 434/28; 703/8

(58) Field of Classification Search
USPC .............................. 434/14; 703/6–8; 709/202
See application file for complete search history.

(56) References Cited

U.S. PATENT DOCUMENTS

| | | | | |
|---|---|---|---|---|
| 3,034,351 | A * | 5/1962 | Johnston et al. ................ 73/167 |
| 4,810,224 | A * | 3/1989 | DeVincent .................... 446/230 |
| 5,625,575 | A * | 4/1997 | Goyal et al. ........................ 703/6 |
| 6,053,736 | A * | 4/2000 | Huffman et al. ................ 434/11 |
| 6,106,298 | A * | 8/2000 | Pollak .............................. 434/29 |
| 6,195,625 | B1 * | 2/2001 | Day et al. ........................... 703/7 |
| 6,595,850 | B2 * | 7/2003 | Yamaki ............................. 463/1 |
| 7,239,777 | B1 * | 7/2007 | Christensen et al. ........... 385/27 |
| 7,788,071 | B2 * | 8/2010 | Bond et al. ......................... 703/6 |
| 8,068,983 | B2 * | 11/2011 | Vian et al. ...................... 701/458 |
| 8,285,533 | B2 * | 10/2012 | Ahrens et al. .................... 703/13 |
| 2002/0192622 | A1 * | 12/2002 | Perry et al. ....................... 434/16 |
| 2003/0047102 | A1 * | 3/2003 | Hartmann et al. ............. 102/211 |
| 2003/0215771 | A1 * | 11/2003 | Bartoldus et al. ............... 434/14 |
| 2004/0041999 | A1 * | 3/2004 | Hogan et al. ............... 356/141.5 |
| 2004/0063501 | A1 * | 4/2004 | Shimokawa et al. ........... 463/49 |
| 2005/0187742 | A1 * | 8/2005 | Collodi .............................. 703/2 |
| 2006/0149516 | A1 * | 7/2006 | Bond et al. ......................... 703/6 |
| 2007/0293314 | A1 * | 12/2007 | Goden et al. ..................... 463/32 |
| 2009/0099824 | A1 * | 4/2009 | Falash et al. ....................... 703/8 |
| 2010/0035216 | A1 * | 2/2010 | Trotsky et al. ................... 434/11 |
| 2010/0209880 | A1 * | 8/2010 | Leonard et al. ................. 434/12 |
| 2010/0256957 | A1 * | 10/2010 | Slavik ............................... 703/2 |
| 2011/0143319 | A1 * | 6/2011 | Bennett et al. .................. 434/14 |
| 2011/0283086 | A1 * | 11/2011 | Mejdrich et al. ................ 712/30 |
| 2011/0311949 | A1 * | 12/2011 | Preston et al. .................. 434/16 |
| 2012/0032526 | A1 * | 2/2012 | Lundgren ...................... 307/106 |

* cited by examiner

*Primary Examiner* — Nathan Hillery
*Assistant Examiner* — James Hull
(74) *Attorney, Agent, or Firm* — Tiajoloff and Kelly LLP

(57) ABSTRACT

A network connects stations in a distributed physics based simulation system. When the simulation detects that a weapon, especially a missile or directed energy beam, is engaging a target vehicle, one physics station determines damage status of the target vehicle. The detonation or strike of the weapon is applied to a model of the vehicle composed of pieces each made up of a number of parts. Where the damage to a piece of the vehicle exceeds a predetermined threshold, the piece is removed from the vehicle, and where a predetermined maximum damage is reached for the vehicle, the vehicle is considered destroyed. The damage assessment from the weapon is made using raytracing in a physics engine that is also used to control movement of virtual objects in the simulation according to rules of physics of the physics engine.

6 Claims, 23 Drawing Sheets

AAMRAM MISSILE TEXTURE AND WIREFRAME MODELS

MIG-29 AND PBEG WIREFRAME MODELS

REFERENCE EXPLOSION OF 1 KG TNT

XCITE-PBEG INTERACTION AND VISUALIZATION

MODIFICATION TO XCITE DAMAGE CALCULATION

PBEG MODEL (LEFT), XCITE ENGAGEMENT INITIALIZED (RIGHT)

MISSILE IMPACT AND TARGET BREAKUP

FULL THERMAL PROCESS

MATLAB SIMULATION OF HEAT SPREADING

AERO CONTROL MODULE BLOCK DIAGRAM

ENHANCED VIEW OF AIRCRAFT CONTROLLER BLOCK

COMPARISON OF POSITION

SYSTEM BLOCK DIAGRAM

MULTIPLE HITS ON ONE COMPONENT

XCITE AND PBEG INTERACTIONS

VISUALIZATION, MAIN VIEW

Close up view of the heads up display.
Units are in Kelvin, meters, and seconds respectively.

TEST SCENARIO

PHYSICS-BASED SIMULATION OF WARHEAD AND DIRECTED ENERGY WEAPONS

This invention was made with government support under USAF CRADA number 03-225-HE-02 awarded by the U.S. Air Force, Air Force Research Laboratory, 711th Human Performance Wing, Human Effectiveness Directorate, Warfighter Readiness Research Division. The government has certain rights in the invention.

FIELD OF THE INVENTION

The present invention relates to simulator systems for simulating vehicles, especially aircraft in combat, and more particularly to distributed simulation systems using physics-based environment simulation for combat aircraft.

BACKGROUND OF THE INVENTION

Simulation systems are frequently employed to train operators of vehicles, especially pilots of aircraft, in various simulated combat exercises in which a warfare theatre and various forces are modeled. One particularly effective system for providing such simulation to one or more trainees linked by a distributed network is shown in U.S. published patent application 2009/0099824 A1 of Falash et al., published on Apr. 16, 2009, and entitled DISTRIBUTED PHYSICS BASED TRAINING SYSTEM AND METHODS, which is herein incorporated by reference in its entirety.

The interactions of such a simulation may be very complicated and take place at very high speeds. Modeling such highly-complex entity interactions with high precision is challenging in distributed training simulations, and modeling a high speed missile and its interaction with an aircraft target is particularly difficult. Missiles and aircraft can close together hundreds of feet in a fraction of a second, which can present a problem even in a purely localized group of simulators, and becomes much more difficult in a more geographically-distributed system where there is also a problem of latency, i.e., communication delays caused by the distance between the simulators and the lag of the interlinking network.

Even with rapid processing frame times and manageable network latencies, an error in position between a missile detonation and the aircraft target is likely to occur in distributed simulations. Very slight positional errors introduced by latency and jitter can cause missile models to fail. Even when the distance errors are in the tens of feet, the missile's small warhead and an inexact target aircraft location can produce significant inaccuracies when calculating the effect of detonation effects or the occurrence of weapon impacts.

One approach is statistics-based and it assumes damage based only on missile proximity at the time of detonation (assuming it can be accurately interpreted by the simulation) and a pre-determined probability of kill ($P_k$) for the missile. For example, the $P_k$ value might be such that if a missile passes within twenty meters of a target aircraft, there is a 95% chance that the aircraft is destroyed.

In the existing protocols and standards, most weapons effects are resolved by this proximity-based $P_k$ and "a roll of the dice" (or random number generation or other computer randomness/probability resolution method). That approach typically does not factor the exact aspect, geometry, aircraft material strength, and missile warhead capability at the time of detonation. Also, latency between simulations and jitter may degrade these models in higher-fidelity systems.

In lower-fidelity models, the $P_k$ may not rely on detonation distance, or may be very insensitive to distance. In those systems, or in a distributed simulation that encounters lost data packets and network delays, the simulated missile sends data to the effect that any detonation is a direct impact, i.e., a "zero" value miss distance. The simulator host computer system of the targeted vehicle can then accept or reject the "kill" based on its own data of the interaction. Most host computer systems in the targeted aircraft try to calculate the perceived miss distance independently, and to then use a localized statistical approach. Others may just automatically accept the "kill" and destroy the targeted aircraft 100% of the time. This mismatch between systems can lead to confusion as to whether a missile was truly effective or not.

Other systems increase the kill distance of the warhead to compensate for any latency or network issues, sometimes up to thousands of feet, with an obvious loss of accuracy in the simulation.

Significant training issues can arise from these two approaches to missile warhead modeling. The pilot in a high-fidelity flight simulator might have maneuvered or reacted to a missile effectively, but was nonetheless killed by a bad roll of the dice or a poorly implemented kill decision in the simulation system. Being on the unlucky side of the roll of the dice that gets one's ownship destroyed often leaves the trainee who was hit by the missile with questions like "why did it kill me?", "how close was it?", and "how could I have better survived?" It also becomes impossible to tell the pilot how to improve his counter-missile defensive tactics if the feedback from the results of the engagement appears random.

In addition, new weapon systems have advanced beyond the mechanical type of projectile to include lasers and other energy-based weapons. The difficulty of assessing effectiveness in a simulation of a directed energy weapon, e.g., a laser system, may be even more complex than determining missile effectiveness, due to the even higher speed of the damage delivery and the longer duration of interaction with the target.

These overall difficulties with the prior art simulation systems result in the accuracy of the simulation and fair fight parameters of the training being reduced, and the inability to accurately determine effectiveness of a missile or a directed energy weapon against a target makes training in defensive strategies very difficult or impossible.

SUMMARY OF THE INVENTION

It is therefore an object of the present invention to provide for a computerized simulation system and method in which a vehicle, e.g., an aircraft, is simulated so that limited damage short of destruction can be assessed.

It is further an object of the system to provide such a simulation in which the effect of missiles or directed energy weapons is realistically simulated, and so that training in defensive maneuvers against missiles or directed energy weapons may be more effective.

According to an aspect of the invention, a method for providing a computerized interactive to a user at a simulation station communicating over a network comprises providing a computerized simulation of operation of the vehicle in a simulated environment, providing a computerized simulation of a weapon operating in the simulated environment, and making a determination in the computerized simulation of an engagement of the weapon with the vehicle in the simulated environment. The method further comprises performing a computerized interaction modeling of the weapon with a model of the vehicle responsive to the determination of the engagement of the weapon, and determining as a result of the modeling interaction a damage model of the vehicle. The operation of the vehicle is then simulated based on the damage model.

In a particularly preferred embodiment, in the above method the computerized simulation of the vehicle includes storing physics data on a computer accessible memory coupled with a physics engine associated with the simulation station. The physics data defines physics parameters of a plurality of virtual objects in the simulated environment. The position of the vehicle in the simulated environment is determined with the physics engine based on the physics data.

According to another aspect of the invention, a system for distributed simulation of aircraft in combat comprises a plurality of simulation stations for respective users connected via a network. Each of simulation station has a respective physics engine and data storage storing scene data defining a version of a shared simulation environment containing virtual entities, including a respective aircraft associated with each simulation station, and in which positions of the virtual entities are determined by the physics engine applying physics rules. The simulation stations each include a display visible to the user and an image generator rendering from the scene data a sequence of frames of out-the-window video displayed thereon in real time. A simulation administration computer system stores data corresponding to authoritative positions of entities in the simulation environment. A physics station is connected with the network and it comprises a physics engine. The simulation administration computer system transmits PDUs of the authoritative states for the entities over the network to the simulation stations. The simulation stations each receive the PDUs and derive force data values therefrom that are applied to the respective physics engine so as to cause the entities in the respective scene data to each move toward the respective authoritative state according to the physics rules. The simulation administration computer system administers simulation of one or more weapon systems. When the weapon system is fired, the simulation system determines if there is a weapon system engagement with any of the aircraft, and, responsive to a determination of an engagement, the simulation administration computer system executes a handoff of control of the authoritative position of the aircraft to the physics station, such that the physics station determines the authoritative position of the aircraft for the system. The physics system accesses data defining a target model of the aircraft responsive to the handoff and performs a weapon interaction modeling of the engagement. The target model data includes data defining a plurality of pieces of the aircraft that are fixedly connected with each other in the simulation. Each piece has a respective maximum damage value, and each piece is composed of a plurality of subsidiary parts connected together in the model. The parts each are a primitive planar facet of a wireframe of the aircraft model. The physics station performs the weapon interaction modeling using a ray-casting or ray-tracing function of the physics engine thereof so as to identify parts subject to damage, and determines for each piece a total damage of all parts thereof and a damage level data value indicative of a degree of damage experienced by the piece. The physics station determines from all of the damage level data values for all of the pieces, aircraft damage data indicating that the aircraft that is either undamaged, destroyed or partially damaged, and, if partially damaged, identifying the pieces that are damaged. The physics system transmits the aircraft damage data to the simulation administration computer system, wherein the aircraft damage data is used to modify the authoritative state data of the aircraft if the aircraft is destroyed or partially damaged.

According to another aspect of the invention, a method of operating a physics-based simulation system for simulating a vehicle and a weapon system is provided. The system has first and second computerized stations connected via a network. Each of the stations includes a respective physics engine. The method comprises modeling at the first computerized station operation of the vehicle using a vehicle model and transmitting entity state data for the vehicle over the network as a master synchronizer therefor, and modeling at the second computerized station operation of the weapons system and transmitting authoritative entity state data for said weapons system over the network as a master synchronizer therefor. Responsive to a determination of firing of the weapon, one of the computerized stations or a third computerized station having a respective physics engine is assigned as master synchronizer for both the vehicle and the weapon. Engagement of the weapon with the vehicle is modeled using the physics engine at the assigned computerized station using a damage assessment model of the vehicle so as to produce a damage status report data. Subsequent operation of the vehicle is modeled at the first computerized station using the vehicle model or a version thereof reflecting damage defined by the damage assessment data.

In the embodiment shown herein, the physics-based system generally works generally as described in US pub. app. 2009/0099824 A1 of Falash et al., except when a weapon is fired.

Prior to weapon fire, a simulation station acts as master synchronizer for an aircraft using data defining a flight model used commonly in the industry to emulate the operation of the aircraft, defined by the aircraft centerpoint. A computer at another location, e.g., a SAF computer, controls the weapon as its master synchronizer, also using pre-fire model data for the weapon installation.

On launch, the physics manager or the simulation system administrative computer reassigns the master synchronizer assignment for the aircraft and/or the weapon so that the master synchronizer for both is at one computer station with a physics engine. That computer station uses its physics engine to model the engagement of the weapon with the aircraft using a damage assessment model of the aircraft made up of parts with damage limits, and a model of the weapon. The model of the weapon if it is a missile includes the structure of the missile in parts that become fragments if there is a detonation.

If the weapon is a missile, modeling of the engagement includes a determination of detonation, followed by a determination of the effects of the blast pressure and of fragmentation of the missile using ray casting of the physics engine to identify the parts of the damage assessment model of the aircraft struck. If the weapon is a directed energy weapon, the effect of the beam hit on individual parts is determined using the physics engine to determine by ray casting which parts are hit, and also to model the heating and cooling of parts using a mechanical analogue model that mimics the effect of the beam.

The computer system resolves the effect of the modeled engagement as a damage status report for the aircraft sent back to the physics manager or simulation administrator module. The damage report may be that the aircraft is not damaged, that the aircraft is partially damaged, or that the aircraft is destroyed. If the aircraft is undamaged, the computer system surrenders its role as master synchronizer for both the aircraft and the weapon system, and the role of master synchronizer is returned to the systems that originally had those functions, and those systems return to determining the authoritative position and state of the aircraft and the weapon system.

If the aircraft is partially damaged, the original master synchronizer system (usually a simulator station for the aircraft if human controlled) may be reassigned, with the flight model of the aircraft modified to reflect consequences of the partial damage. Alternatively, if the aircraft is partially damaged, the computer system that modeled the weapon engagement may continue to act as master synchronizer for the aircraft, but using a partially damaged version of the damage assessment model.

If the aircraft is destroyed, the original station controlling it is restored as its master controller, and it processes the aircraft destruction as usual in a simulation of the prior art.

Other objects and advantages of the invention will become apparent from the present specification.

DETAILED DESCRIPTION

1. System Architecture

Figure 1:
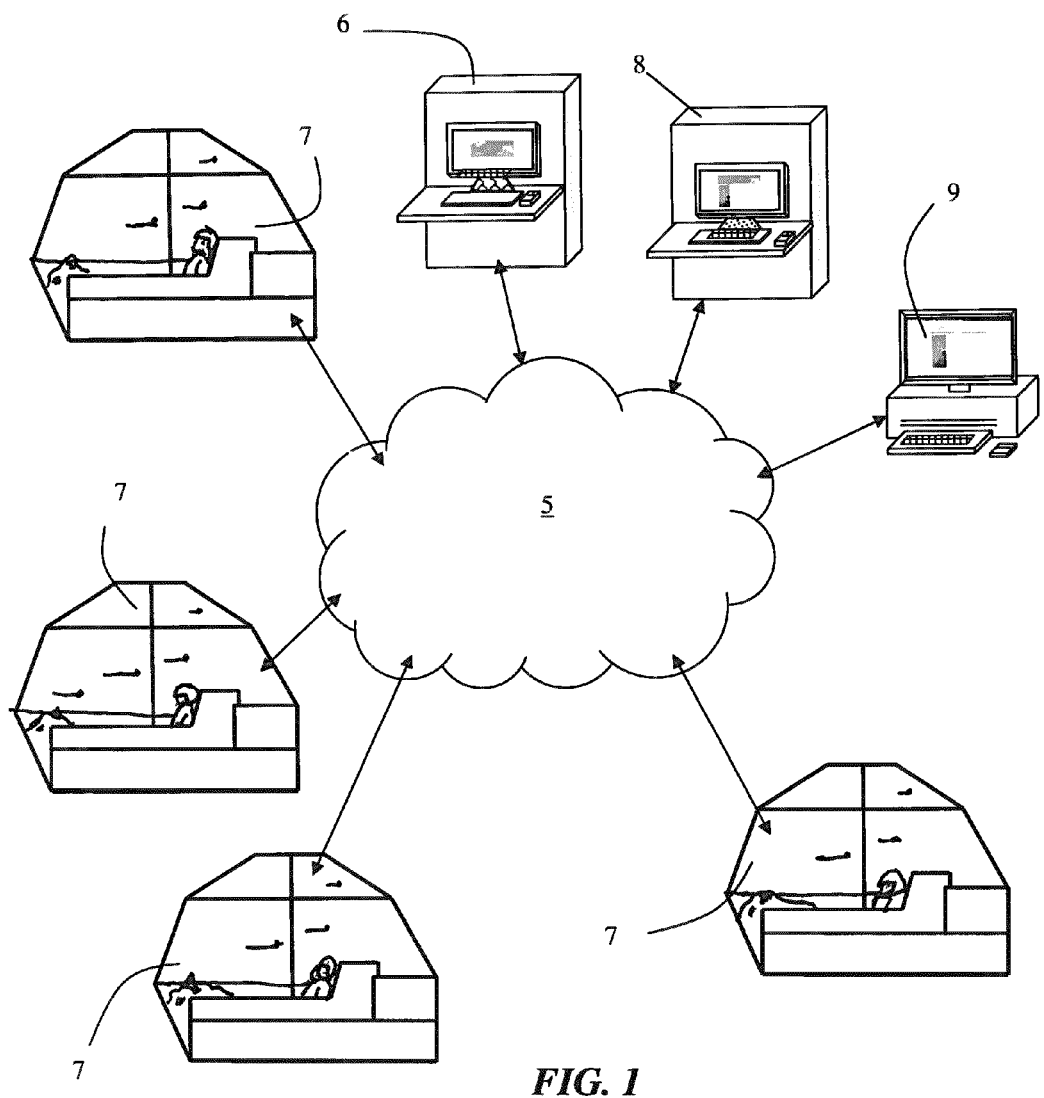
FIG. 1 is a diagram showing the general configuration of a system according to the invention.

FIG. 1 shows a general diagram of a system according to the invention.

The simulation system comprises a number of computer systems 6, 8 and 9, and a number of geographically distributed simulation stations 7 linked via a network 5. Network 5 is preferably a DIS (Distributed Interactive Simulation) network, but may be any LAN, WAN or the Internet.

The computers 6, 8 and 9 are of any architecture suitable to support the software that runs on them, as will be discussed below, and they may be servers or PCs or larger mainframe computers.

The simulation stations 7 have the general configuration typical of simulator stations well known in the art, and they each preferably comprise a simulated cockpit accessible to a user, displays providing out-the-window views to the user or users, and other structure common to vehicle and/or weapon system simulators. Each simulation station also comprises one or more computers administering the local simulation operation.

The computer system of each simulator station 7 communicates over the network 5 according to a distributed physics-based shared simulation arrangement generally as described in U.S. published patent application 2009/0099824 A1 of Falash et al. This physics-based environment generation (PBEG) system ensures that all simulator stations 7 are working with basically the same virtual world and virtual objects over the entire system independent of latency in the communications across the network 5.

In PBEG operation, Physics Data Units (PDUs) are periodically transmitted to the simulator stations 7 defining forces being applied to the virtual objects defined in the scene data. The physics data from the PDUs is fed into a physics engine at the simulation station 7, causing movement of virtual objects or entities in the virtual world according to the stored physical rules of the physics engine. In addition, synchronization data in the form of PDUs of entity states are sent periodically, e.g., at a frequency of 0.5 Hertz, to provide each simulator station with authoritative data from a master synchronizer of where virtual objects should be in the virtual world. When the synchronization data is received, the simulation station 7 has an internal PID or PD controller that works with the local physics engine to move the virtual objects into the places that they are expected to be in according to the synchronization data.

The simulator stations 7 preferably all provide for visualization of the virtual environment and have OTW displays displaying to the trainee therein in real time a view of the virtual environment in which the simulation is going on. Particularly preferred for OTW displays are systems such as disclosed in U.S. published patent application 2009/0066858 A1 of Turner et al. published on Mar. 12, 2009 and entitled DISPLAY SYSTEM FOR HIGH-DEFINITION PROJECTORS, herein incorporated by reference in its entirety. These OTW displays include image generators that generate out-the-window (OTW) scenery as serial frames of video, each frame of which is rendered by known processes from locally stored scene data that defines the position and appearance of virtual objects that make up the virtual environment. The scene data includes data defining the appearance of each object, and its location. The location of each object is defined by the operation of the local physics engine. The rendering is performed using any three dimensional rendering system, as is well known in the art of simulation.

The PBEG system includes a management computer, e.g., computer 6, also described in The PBEG system operates generally as described in U.S. published patent application 2009/0099824 A1 of Falash et al., that runs software modules that administer the simulation physics operation by sending and receiving data to and from the simulation stations. The system 6 may also provide other types of supportive computation, e.g., determine the actions of Self Actuated Forces (SAFs), which are computer controlled active entities, in the virtual environment. Interaction with a human administrator may be accomplished by other modules, such as the GUI front end ThreatIOS, running on the host computer 6, which allows an operator or instructor to make configuration changes in the PBEG system or the simulated world.

XCITE (Expert Common Interactive Training Environment) constructive simulation software is a software suite that runs on a computer of its own preferably, e.g., on computer system 9. The software version used is XCITE 5.1, and this system maintains the virtual world of the simulation, accessing scene data and supporting all the virtual objects or entities in the virtual environment of the simulation. It defines the simulated environment and maintains data identifying the current authoritative (or master synchronizer) position of all entities in the virtual world. It conducts the simulation; PBEG is in a sense a utility that allows XCITE to operate effectively over its physics farm.

Figure 2:
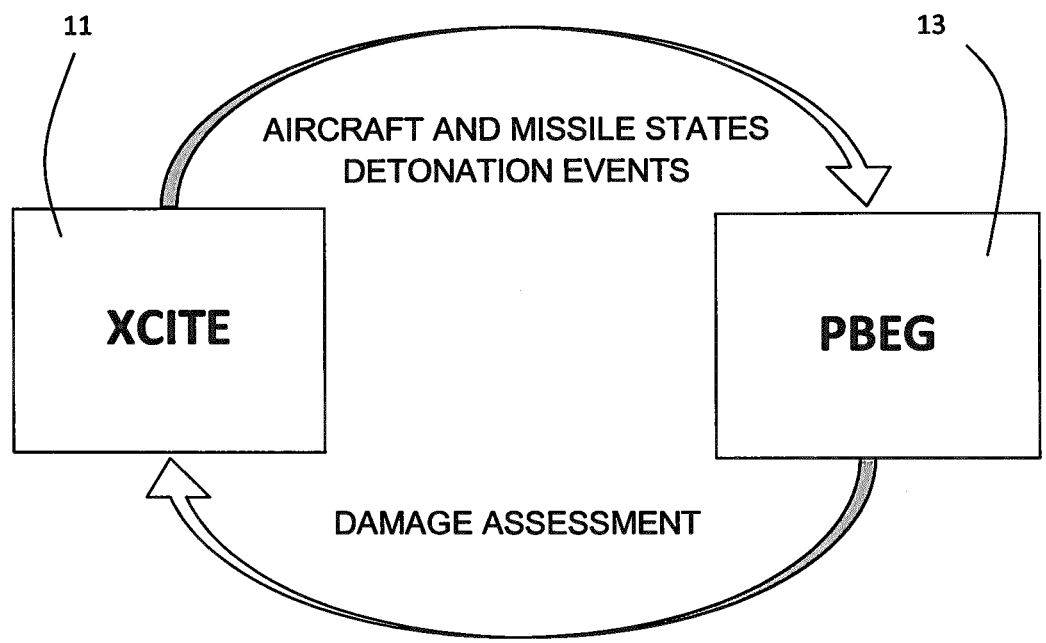
FIG. 2 is a diagram of the transmission of data between the XCITE and PBEG modules of the system.

The linkage between PBEG and XCITE is arranged so that data can be transferred via the physics farm as PDUs that allows the use of certain hardware, especially graphics hardware that does ray tracing, for computation of certain events associated with warhead detonation or directed energy weapons fire. Referring to FIG. 2, XCITE 11 interfaces with the PBEG portion 13 of the system. The PBEG 13 is programmed to receive data corresponding to the simulated aircraft and missile states and detonation events or to directed energy weapon discharges, and to then take entity control of the simulated target aircraft and missiles from XCITE 11 and from this data to determine the level of damage, provide a realistic visualization of the impact by image generator rendering in the displays of the simulators 7, and return data defining a damage assessment to XCITE 11. The damage assessment then is incorporated into the authoritative entity state data in XCITE, as will become clear herein.

Simulation of Warhead Detonation

The present invention overcomes or reduces some of the technical problems in distributed simulation missile-model performance are compensated for by utilizing advanced algorithms and hardware.

One of the problems with missile modeling is the amount of computational effort required to identify the trajectories of all the fragments of the weapon and which of the many nearby entities in the virtual environment the fragments actually hit. The inventors have noted that the movement of the fragments is analogous to line-of-sight ray tracing as done by dedicated graphics processors.

According to a method of the invention, the missile engagement is downloaded to a parallel process for more accurate and efficient computation. Studies have demonstrated success in moving complex constructive interactions for computer generated forces from CPUs onto PC physics processing units (PPU) and graphics processing units (GPU) to compensate for the limitations of high entity counts and line-of-sight calculations, as described in Verdesca et al. "Using Graphics Processor Units to Accelerate OneSAF: A Case Study in Technology Transition, Interservice/Industry Training, Simulation, and Education Conference (I/ITSEC) 2005, herein incorporated in its entirety by reference. An approach similar to that of the Verdesca et al. paper is used to move similarly calculation-intensive interactive models onto comparable architectures for improved results. Ideally, the physics processors of the PBEG system of the invention are "optimized" by design for calculating physical interactions of the blast, warhead fragmentation, and impact on the target.

The blast pattern from a warhead at close ranges can approximate a ray tracing problem, similar to the algorithms that drive highly detailed scene generation in graphic processors. As was described in Purcell et al., Ray Tracing on Programmable Graphics Hardware, ACM Transactions on Graphics, 21 (3), pp. 703-712, 2002.2002, herein incorporated in its entirety by reference, ray-tracing algorithms run faster in GPUs than on CPU based architectures. Therefore, GPUs are efficient at modeling the flyout of fragments and the supporting ray tracing problems, such as line-of-site, target planform and exposure.

In the preferred embodiment, the PBEG system runs an NVIDIA PhysX physics computational engine to perform damage calculations. This computational engine was chosen due to extensive experience with this commercial OTS product. The physics-based methodology was applied to the XCITE computer generated forces (CGF) system in place of the normal statistically based damage assessment.

The physics-based approach relies upon missile proximity, explosive force, and the structural strength of the various aircraft components in determining aircraft damage, as will be described herein. The PBEG performs a method in real-time to calculate the results of an air-to-air missile engaging a target. The method comprises the following steps:

1. Handing off of the XCITE CGF missile and target entity states to the PBEG for off-board calculation of the impact.
2. Processing of aerodynamic models of the missile and target aircraft in parallel so as to preserve entity state within the distributed simulation.
3. Generating or accessing multi-surface, 3-D models of the missile and of the target airframe that each represent a set of individual parts of the respective object for physics-based interaction and later visualization.
4. Calculating structural strength for each part of the aircraft.
5. Modeling the explosive impact on the dynamic articulating 3-D target by calculating applied forces from the missile detonation (blast and fragmentation impact) using physics calculations and PhysX physics engines.
6. Accurately and rapidly transmitting physics-based results and state information from missile impact in real time back into the XCITE CGF simulation.
7. Generating, after the engagement is completed, a 3-D visualization of the engagement.

After these steps are executed, the responsibility for the target aircraft (or what is left of it after the missile hit) may be returned to XCITE, as may the fragments of the missile. The authoritative position of those entities is governed by XCITE and determined as before the engagement, e.g., the authoritative position of the target aircraft may be determined at the associated simulation station 7, for example, if the pilot of the target aircraft continues to operate the target aircraft if it is undamaged or has sustained only partial damage.

Step 1. According to the PBEG architecture, entities or virtual objects (such as missiles and aircraft) in the virtual PBEG environment are controlled by synchronizers. One of these is a master synchronizer at one of the simulation stations, usually the simulation station that is most involved with that entity. The master synchronizer determines authoritatively for the entire system the location and state for the entity with which it is associated, and XCITE receives this information and distributes it as the entity state data to the other simulator stations. All other simulation stations in the PBEG system have slave synchronizers corresponding to the entity, and they apply physics rules to the entity to cause it to move to the entity state data location directed by the master synchronizer.

Prior to the determination of an engagement of the missile with the target aircraft, the missile and the target aircraft each have respective master synchronizers, which may be in different locations. The first step of the method is that XCITE reassigns the control of the entity states of the missile and the target aircraft to the PBEG.

Step 2. Once the PBEG has control of the missile and target aircraft entity states, the PBEG determines their position data at one location in the physics farm using one physics engine and relying on aerodynamic models of the missile and the aircraft, which are the usual model used in the simulation pre-impact. The physics engine may be in a location and apparatus in the PBEG system that is dedicated to this type of missile engagement. This is to prevent any latency between the two entities that can cause divergence of the detonation outcome. The determination of the interaction of the missile and the target aircraft at the PBEG location will become the authoritative system state for all of the simulation.

Step 3. The system has 3-D physical computer models of the missile and the target aircraft prior to the engagement. These may be the same models as are used during pre-engagement simulation, or they may be higher or lower definition models solely used for detonation or damage modeling.

Each model is computer-accessible data stored so as to be accessible to the PBEG system. Each model comprises a set of stored data values, one for each of multiple sections, parts or facets of the aircraft or missile. The models include physics data, i.e., dimensions and mass of the part, that is used to model the physical consequences of detonation of the missile.

Step 4. The model of the aircraft includes for each component, as will be described below in the example, data indicative of that component's capability of individually sustaining damage.

Step 5. If the scenario, according to the aerodynamic models of the missile and the target in the engagement, are such that the missile engagement leads to a detonation, then, when detonation occurs, the PBEG computes the force of the initial blast shockwave and the impact from each high velocity shrapnel piece striking the aircraft on each specific facet or part defined in the aircraft model. A numerical damage value is assigned for each aircraft part, and damage results are returned to XCITE for training feedback.

As an example of the physics-based method of processing a missile hit, an engagement between a specific aircraft and missile is here described. Variations in the parameters of the aircraft and the missile models may be made by interchanging data from other missiles and aircraft to emulate any aircraft or missile.

As exemplary aircraft and missile, an AIM-120 advanced medium-range air-to-air missile (AMRAAM) and MiG-29 aircraft were modeled. These models were chosen because satisfactory open-source data is readily available to allow reasonable model development. The system is designed so that the data defining the model is capable of being enhanced with higher-fidelity proprietary or classified data if available.

a. The Missile Model

The AAMRAM missile is a commonly deployed air-to-air missile. Because the AMRAAM's specific warhead size, explosive formulation, and fragmentation are unavailable in open sources, a generic TNT model was developed to model the explosive. The other specifications for the missile including missile weight, Gurney Constant, Charge-to-Metal Ratio, and K constant were derived from a variety of open sources. A missile warhead model with simplified TNT explosive and fragmentation is integrated. The fusing model was taken from XCITE.

The model of the example includes values as shown in Table 1 below. These values are adjustable in the PBEG for any type of explosive or fusing model.

TABLE 1

| Open Source AMRAAM Parameters | |
|---|---|
| Missile Part (Piece) | Value |
| Total Weight of Missile | 157 (Kg) |
| Weight of Warhead | 22 (Kg) |
| Number of Fragment Pieces | 198 |
| Weight of Each Fragment Piece | 1.5 (Kg) or less |
| Gurney Constant | 2700 |
| Charge-to-Metal Ratio | 163 |
| K constant | 0.5 |

Figure 3:
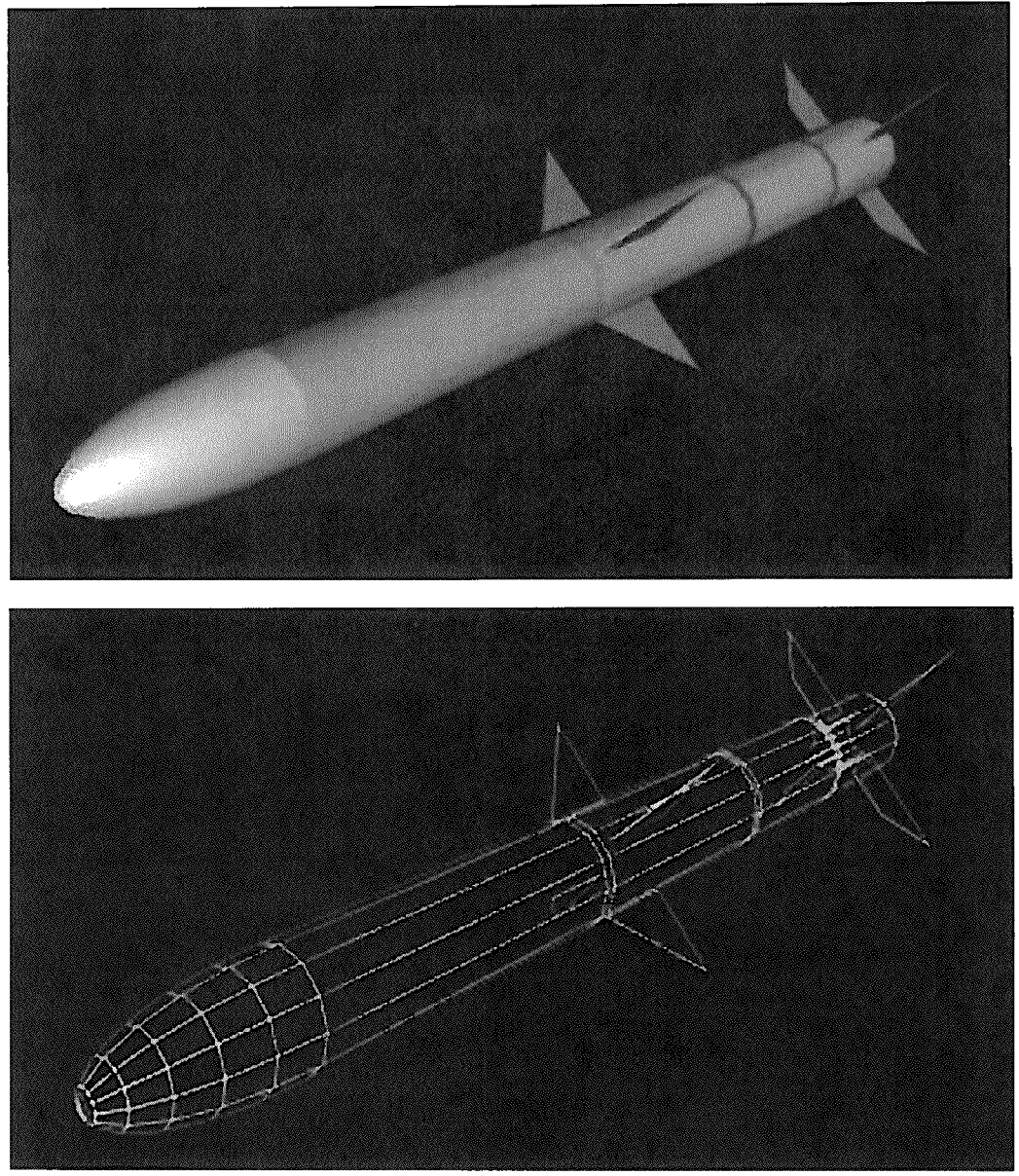
FIG. 3 shows texture and wireframe models of an AAM-RAM missile.

As shown in FIG. 3, a physical 3-dimensional wireframe representation of the missile and warhead were developed so each part of the missile separating during blast could be modeled for impact. The model essentially comprises a list of data sets each defining the dimensions and physics or PhysX data for a respective part that begins to move by itself independent of the other parts of the missile on detonation. The data of the model also includes texture, color and other scene data for rendering that gives the missile the appearance as seen in FIG. 3 (or any other desired appearance), and is used for later visualization of the detonation of the warhead and the subsequent appearance of the separated pieces of the weapon.

b. The Target Aircraft Model

The exemplary aircraft modeled is a Mikoyan MiG-29, with the model created using data available in open sources. The parameters used in the data of the model provided to the PBEG test are shown in Table 2, below.

TABLE 2

| Mass of Main Aircraft Parts | |
|---|---|
| Aircraft Part (Pieces) | Mass (Kg) |
| Engines(2) | 1,000 (each) |
| Wings(2) | 1,000 (each) |
| Vertical Stabilizers(2) | 500 (each) |
| Fuselage | 3,000 |
| Horizontal Stabilizers(2) | 500 (each) |
| Cockpit | 2,000 |
| Total Weight | 11,000 |

Figure 4:
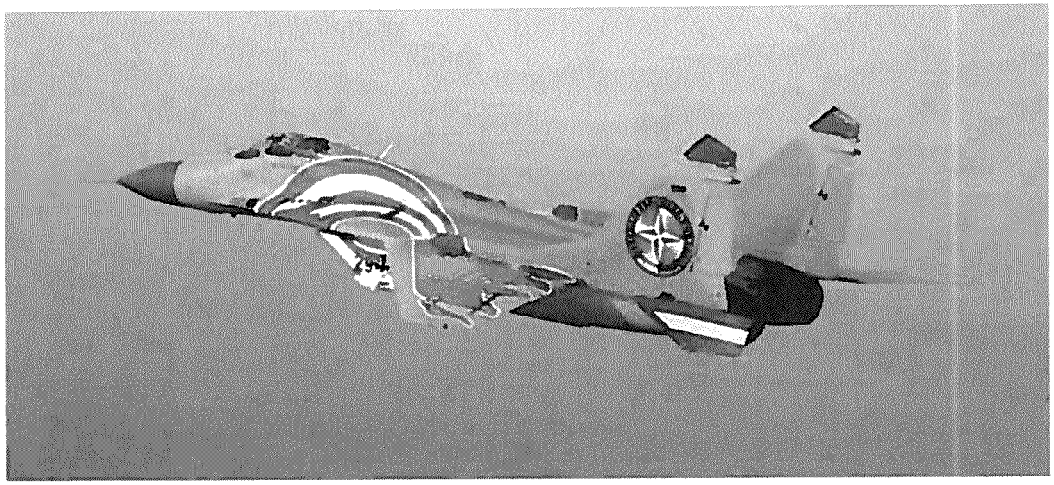
FIG. 4 shows a MiG-29 and a wireframe model of the aircraft.
Figure 4:
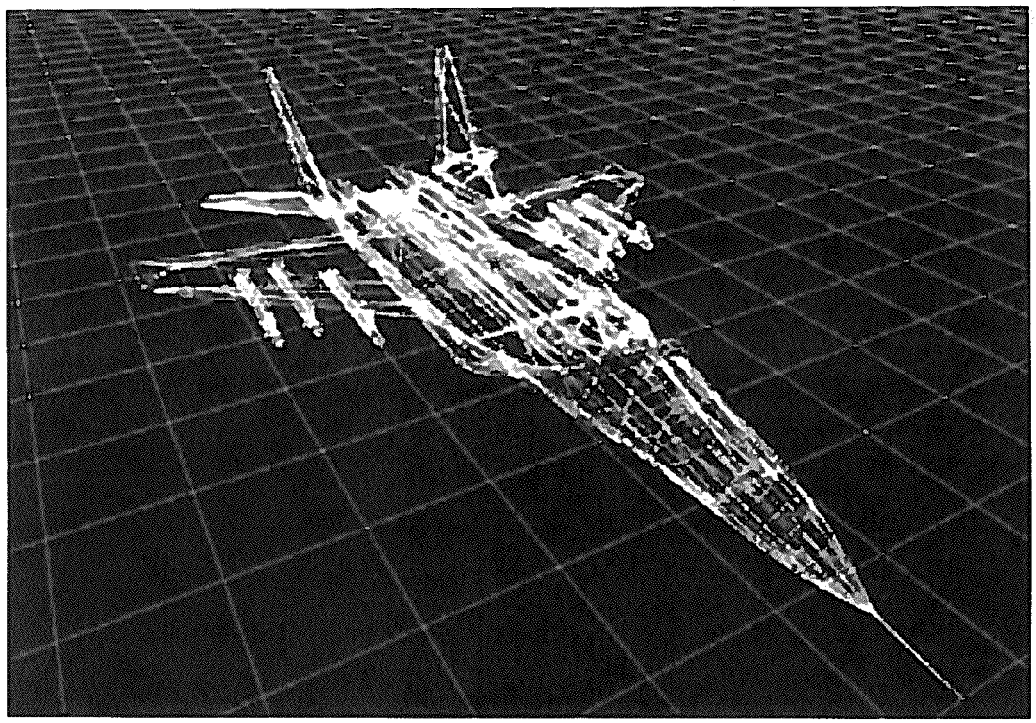

Referring to FIG. 4, as with the model of the missile, the aircraft model is constructed as a wireframe representation. Each major component of the plane is mapped to a corresponding PhysX part, and locations and orientations of these constituent parts of the aircraft are each defined by a respective data set of a list of data sets enumerating all of the parts of the plane, as delineated by the model, to be a physically accurate representation of the aircraft.

c. Modeling the Explosion

Determination of the damage caused by missile detonation is based on the fact that a fixed wing aircraft struck by a missile receives two types of damage, and the modeling of the explosion determines the effects of both. The first type of damage is the due to the blast, i.e., the increase in pressure by the force of the missile explosion. The blast typically damages the aircraft through structural failure and weakening. The second type of damage is the piercing of the aircraft skin from high velocity fragments projected by the missile explosion. Fragmentation damage destroys specific aircraft systems such as engines or fuel tanks.

Blast Pressure

Blast pressure damage is derived by a pressure calculation. To find the pressure caused by the detonation of the XCITE model of the missile, the exact distance from the target to detonation is calculated.

Figure 5:
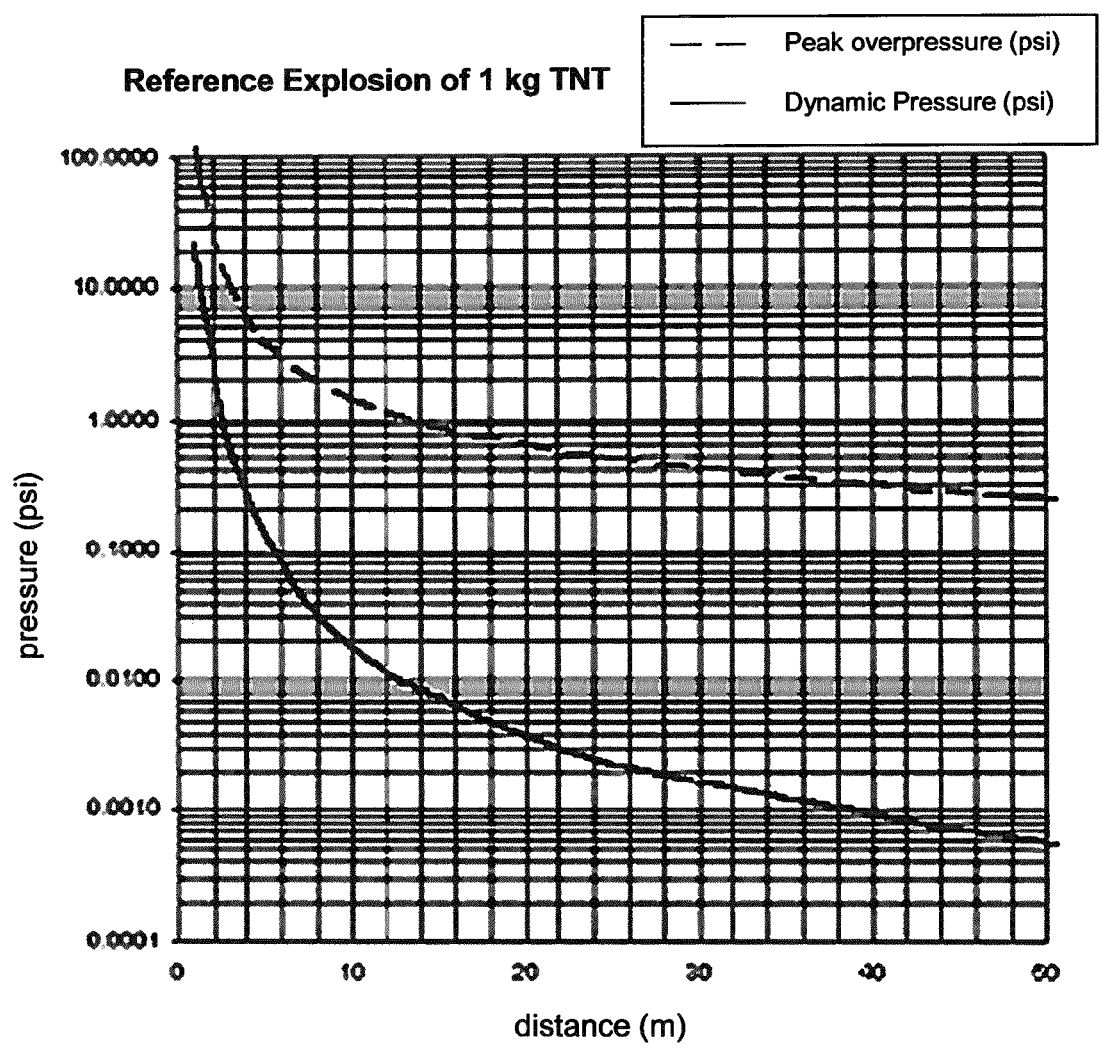
FIG. 5 shows a graph of the pressure produced by a TNT explosion.

The AMRAAM model assumes a 22 kg TNT warhead size. Available data for constructing the blast model is based on a reference explosion of 1 kg TNT, shown in FIG. 5. The blast-damage effect model relies on the fact that, as shown in FIG. 5, two distinct pressures are caused from the blast, peak overpressure and dynamic pressure. For the missile model, these pressures are summed to derive the total blast pressure.

To compensate for the difference between the weight of TNT in the available data and the actual weight of TNT in the AMRAAM missile modeled, the model is adjusted by integrating a distance from explosion to warhead size ratio into the algorithm. Once the ratio of the warhead weight and distance from the explosion was established, that value was used to extrapolate the effects from the data of a 1 kg explosion to a 22 kg explosion and stored in a look-up table indexed by distance. Once the distance from the explosion is determined, the resulting data value is obtained using the look-up table derived from the data source of FIG. 5. The pressure from the blast for the model can then be calculated.

Figure 7:
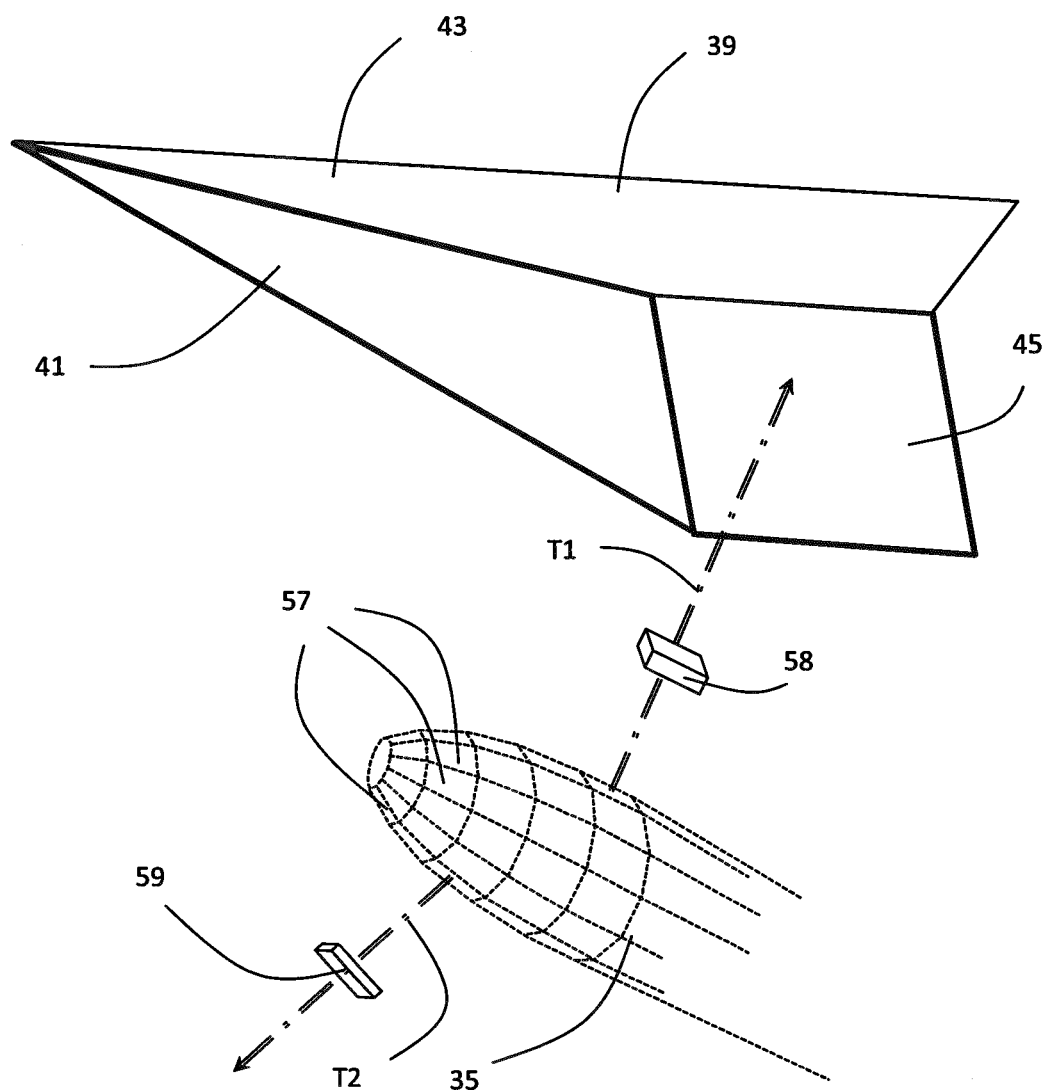
FIG. 7 is a diagram of modeling of fragmentation damage from a missile on detonation.

FIG. 7 illustrates how the effect of the blast is then determined for any virtual objects in the blast area. The warhead 35 detonates at a location as shown in phantom. The explosion results in a radially outward blast from the center of missile 35 as illustrated by some of the directional lines 37.

The next step in the modeling method is to calculate the blast force on the aircraft caused by the total blast pressure. This is derived by multiplying the pressure times the area affected. In order to account for exact aircraft aspect and the actual blast wave rarely being perpendicular to the target surface, the damage calculation process analyzes angles-of-incidence and determines the blast force and resulting damage accordingly for the surface area exposed to the blast.

Figure 6:
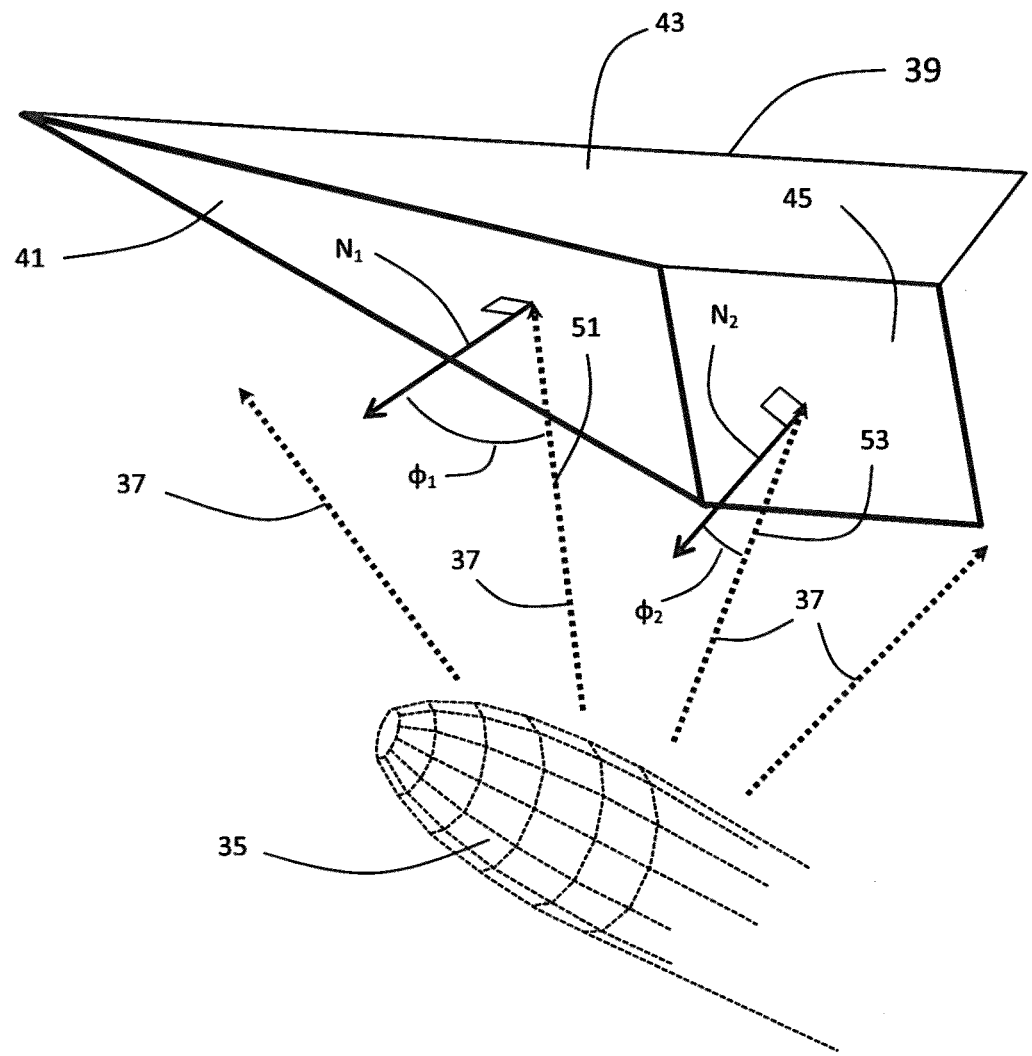
FIG. 6 is a diagram of modeling of the blast wave from a missile on detonation.

The MG-29 model comprises ten large subsystems, called "pieces" herein, such as piece 39 in FIG. 6. Each piece of the MiG-29 is furthermore comprised of many smaller parts, a "part" being defined as a single square or triangular planar facet in the wireframe used to approximate the shape of the aircraft, such as parts 41, 43, and 45 in FIG. 6.

Upon receiving a damage calculation request, PBEG/ PhysX iterates the damage effects of the blast pressure on every part of the wireframe model of the aircraft. The damage on all the parts of a piece is totaled to derive a sum damage data value for the piece that the parts belong to. This is shown in FIG. 6 for three of the parts 41, 43, and 45, which together make up a piece 39 of the target aircraft. A line is drawn from the explosion to each of the parts 41, 43, and 45, which is preferably accomplished using a ray tracing aspect of a graphics processor in the PBEG.

Because there is no unobstructed line of sight from the explosion to part 43, it is not assessed for blast damage. Parts 41 and 45 do have such an exposure, however. The angle of incidence $\phi_1$ or $\phi_2$ between the line 51 or 53, from the centerpoint of the part to the warhead blast centerpoint, and a normal vector $N_1$ or $N_2$ to the planar surface of the part 41 or 45 is determined. The angle of incidence is used to determine the normal component of the blast pressure (i.e., force per unit area) as a percentage of the total blast force at that point. The normal component of the blast pressure is multiplied by the area of the part 41 or 45 to yield a data value for the total force on the part.

The force values for all the parts of the piece of the aircraft are totaled to derive a total force value of the part. That total force value is compared to a predetermined maximum force value in the data model for that piece of the aircraft. A blast damage degree value is determined based on the ratio of the total force for the piece relative to the maximum force value for the piece. If the total force exceeds the permissible maximum, data indicating that the piece of the aircraft has been blast damaged is made.

For example, after an explosion, each of the facets (i.e., parts) of the wireframe constituting the left engine is run through the iterated algorithm. The damage returned is applied to the total left engine damage and a running total is kept. To adjust damage for angle-of-incidence, the center of each part is compared to the edges, and the angle between normal vector and warhead blast vector is calculated. This is included in the overall algorithm to determine the projected blast area. Once the projected area is found it is multiplied by the pressure derived from the data of FIG. 5 to calculate the force caused from the blast, based on the formula for the blast pressure stress:

$$\text{Stress}=\sigma=F/A \tag{1}$$

In the model of the aircraft, the maximum yield force for certain parts of the aircraft are calculated and stored in the model data storage by the computer system for determining if there are any structural failure points resulting from the blast. To determine the maximum yield force for aircraft structural failure of a given part, mass of the aircraft piece affected was used. For design purposes a safety factor of 2 was included, as will be described below.

For the aircraft model, the maximum force that each part can sustain to failure is determined by multiplying the mass values in Table 2 by 9 g's (i.e., 9×9.81 m/sec$^2$). The formula was derived from Newton's second law (F=ma) in which is force is equal to the mass multiplied by the acceleration. The maximum force that can be borne by the pieces of the exemplary MiG-29 is shown in Table 3.

TABLE 3

Breaking Forces (on the MiG-29 Aircraft)

| Aircraft Component (Piece) | Failure Force (N) |
|---|---|
| Engines(2) | 176580 |
| Wings(2) | 176580 |
| Fuselage | 529740 |
| Vertical Stabilizers(2) | 88308 |
| Horizontal Stabilizers(2) | 88308 |
| Cockpit | 353160 |

The values from Table 3 were compared to the forces calculated from the explosion. This comparison or percentage ratio was used to derive a numerical severity value indicative of the degree of the damage, as will be described below Fragmentation Fragmentation damage due to kinetic impacts, i.e., damage inflicted by the piercing of the aircraft skin by extremely high-velocity blast fragments, which are small pieces of metal ejected by the explosion, is also possible in addition to blast pressure damage.

From open source data, it has been determined that for a typical fighter aircraft approximately 4000 Joules of energy are require to pierce the skin. The model for the damage caused from the fragments is determined from this data value of the maximum amount of energy aircraft skin can withstand. The value of kinetic energy is a function of mass and velocity. The mass of each fragment piece is a predetermined data value that is derived from warhead specifications.

Referring to FIG. 7, the model of the missile 35 is used to determine the point and direction of flyout of each of the individual parts 57, 58 and 59. The direction of flyout of each fragment of the missile is set by the structure of the missile and the physics of the initial explosion as discussed previously, or it may be assumed to be straight radially outward from the centerpoint of the missile or of its explosive charge.

However the direction of flyout is determined, the trajectory and identification of the parts, if any, of the target aircraft that are struck is by straight line-of-sight ray tracing along the lines of trajectory T1 and T2. This ray tracing is performed for each of the fragments of the missile using the ray tracing of the graphics processor(s) (GPUs) of the physics engine of a PBEG station that is configured to take over the ray tracing or raycasting involved from XCITE.

The ray tracing returns data identifying, for each fragment, the first part in the model of the aircraft that the ray of its trajectory intersects, if any. In FIG. 7, for example, missile part 59 follows line T2, which extends away from the target aircraft, and it does not hit anything. Part 58, instead, follows line T1 to intersect with part 45 of the target aircraft.

The trajectory is a straight line rather than a slightly parabolic curve as it would be in the real world detonation, but the speed of ejection of the fragments from the detonation is so high that any difference is negligible. The ray tracing also deals with the location of the parts of the target aircraft based on either their immediate location or a slightly extrapolated position to compensate for the travel time of the fragment parts to the target aircraft.

Velocity calculation is more complicated, since a fragment may eject from the blast with an extremely high velocity but decelerate very rapidly due to aerodynamic drag. To determine the velocity of each fragment, the algorithm determines two factors: (i) the initial velocity and (ii) the deceleration as a factor of distance. The initial velocity is calculated from the Gurney Constant, Charge-to-Metal Ratio (C/M), and K constant for cylinders. The formula for initial velocity $V_0$ is:

$$V_0 = \sqrt{(2E)} \sqrt{\frac{C/M}{1+K(C/M)}} \quad (2)$$

To find the velocity as a function of distance, the formula used includes the initial velocity and the distance traveled. The distance in the formula is calculated using the XCITE fusing model. Since this distance is from the detonation point to the center of the target model, the distance used in the calculation is interpolated for each part.

$$V(S) = V_0 e^{(-\rho C_d AS/2M)} \quad (3)$$

Where S=distance from warhead to the part, in is the mass of the part, $\rho$ is the density of air, $C_d$ is the coefficient of drag, A is the cross-sectional area of the part, $V_0$ is derived by equation 2.

This formula includes values that change depending on certain warhead and atmospheric parameters. The coefficient of drag used is dependent on the shape of the fragments. The fragments ejected from an AMRAAM resemble small bricks which have a coefficient of drag of approximately 2.1. This value can be edited depending on the shape of fragments. The cross sectional area of the fragments changes depending on their size and shape. The value used for this test for the present example is 0.2 meters, which is an approximation of the size of the AMRAAM fragments.

The mass used in the formula is the mass of each individual fragment piece and was calculated to be 0.1 kg for the AMRAAM. This was obtained by dividing the warhead mass into 198 individual pieces. The density of air used in the test was 1.2 kg/m$^3$, which may be obtained from standardized atmospheric models for any altitude. The kinetic energy KE transferred by each fragment is therefore obtained by calculation according to the following equation:

$$KE = 0.5 \, MV^2 \quad (4)$$

If the value produced from this formula exceeds the predetermined threshold value for maximum kinetic energy (here, 4000 Joules) then it is determined that aircraft skin penetration occurs.

Damage Assessment

A data value is derived for each piece corresponding to a damage assessment from the determination of the level of blast pressure and fragmentation.

In the preferred embodiment, the data value is one of four values corresponding to four categories: no damage, light damage, medium damage, or heavy damage. The damage level is based on a comparison of the calculated total force applied compared to the maximum force for each piece is determined the damage category. This breakdown is shown in Table 4.

In addition, the degree of damage from fragmentation is added where the missile fragment hits the aircraft part at a kinetic energy level that is above the predetermined threshold for penetration of the part. Penetration is treated as heavy damage for the penetrated part.

TABLE 4

Damage Assessment Criteria

| Damage Level | Damage Force |
|---|---|
| None | 0% to 30% of Force Max Applied |
| Light | 30% to 50% of Force Max Applied |
| Medium | 50% to 100% of Force Max Applied |
| Heavy | Greater than 100% of Force Max Applied |

The data of damage force categories is refined into more detail for each aircraft piece as shown in table 5 below. The damage assessment is cumulative, meaning that if both the cockpit and wing receive light damage, the number values are added together to yield a data value for the total damage. In the preferred embodiment, if that data value is a number that has exceeded 100, the aircraft is determined to have been destroyed. However, due to the variations in damage level by part, it may be understood that the aircraft may lose an engine or a stabilizer and still remain somewhat operable, while losing a wing or the cockpit constitutes aircraft destruction.

TABLE 5

Aircraft Damage Assessment

| Aircraft Damage Level | Fuselage | Cockpit | Wing | Engine | Stabilizers |
|---|---|---|---|---|---|
| Light | 10 | 15 | 15 | 5 | 5 |
| Medium | 25 | 40 | 25 | 25 | 10 |
| Heavy | 100 | 100 | 100 | 50 | 15 |

The system allows a system administrator or instructor to change the preset values of the data of the models, depending on the aircraft to be used.

Consequences of Damage

The components of the PBEG and the XCITE Computer Generated Forces software are configured to interact seamlessly for the damage calculation interface.

If a vehicle is computer-controlled, the controlling module within the PBEG system is the SAFDriver module in the administrative simulation system, i.e., XCITE. SAFDriver coordinates the data flow between all components, including transfer of data from XCITE to the PBEG, PhysX based damage calculations, visualization, and transfer of damage calculations back to XCITE. PhysX and XCITE are the primary information sources sending entity state data to PBEG. The entity state for the target aircraft is mirrored into the PBEG and is processed in parallel with the XCITE entity state, allowing realistic behavior to be modeled. Typically, SAFDriver uses the entity state data from XCITE as the de facto mode of operation, especially if the aircraft is undamaged.

Upon damage or a catastrophic entity kill, control of the plane is shifted to PhysX, which manages the damaged aircraft entity state.

Generally, the destroyed aircraft becomes the set of its constituent pieces released from being held together and all moving independently according to their respective physics data. The DIS environment still maintains the original XCITE entity state until the destroyed aircraft is deleted after the kill, but the engagement visualization model in the PBEG operates pursuant to the physics rules of the PhysX.

Figure 8:
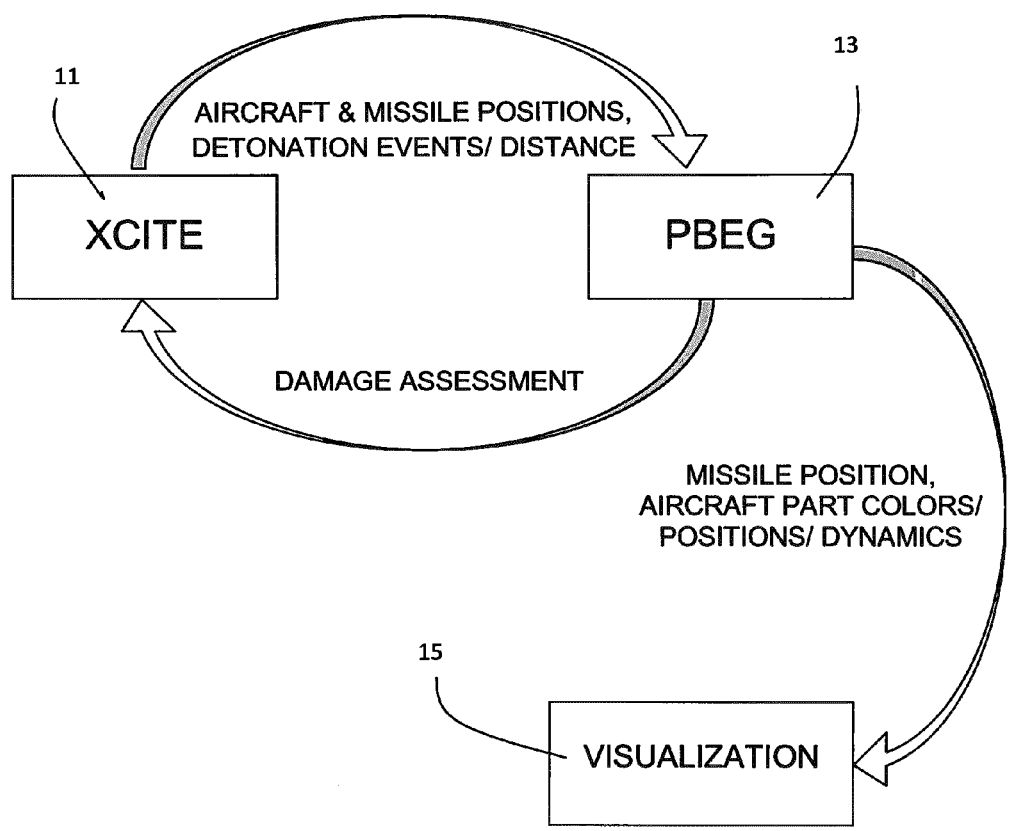
FIG. 8 is a diagram of XCITE and PBEG with the visualization module.

This is illustrated in FIG. 8. The PBEG system 13 defines the locations and orientations of entities in the virtual world based on the parameters of their physics data, and this information is incorporated in scene data that is accessed by the visualization 15 of the system. Specific data is provided to the visualization module 15, including missile position data, the location and condition of aircraft parts and their appropriate colors, positions and dynamics.

A more complicated case arises when a piece is blown off the aircraft, but the plane survives and continues to fly, in at least some partial sense, as a controlled entity in the virtual world, and doers not disassociate as in a full destruction scenario. In that case, the part that is damaged is separated from the remainder of the aircraft, while the remainder of the aircraft is returned to control by the appropriate PBEG location in the physics farm. The surviving parts of the aircraft are still structurally held together and continue to operate together according to the laws of the local physics engine, the physical parameters of the surviving parts, and any operator input.

To support this aircraft state, the XCITE computer generated forces software itself is modified to bypass the standard damage calculations and to instead use a result provided to it from PBEG. Also included in the XCITE modifications was code to push entity state data to PBEG in a non-DIS manner.

In the case of limited damage to the vehicle, the damage assessment may result in return of authoritative control to the simulator station corresponding to the virtual vehicle. In that case, the simulation station adjusts its simulation or model of the vehicle simulated to correspond to the damage done. For example, if an engine is destroyed by the weapon hit, the engine will be shut off in the simulation, but the aircraft will continue to be controlled via the simulator.

Alternatively, rather than returning control of the authoritative entity state of the partially-damaged aircraft to the simulator station, the control may remain at the PBEG station where the missile engagement was modeled. In that case, the continued control of the aircraft is accomplished by receiving PDUs from the simulation station over the network and implementing them into a modified damage assessment model with its master synchronizer in the PBEG station, e.g., the damage model with some parts separated from it.

Figure 9:
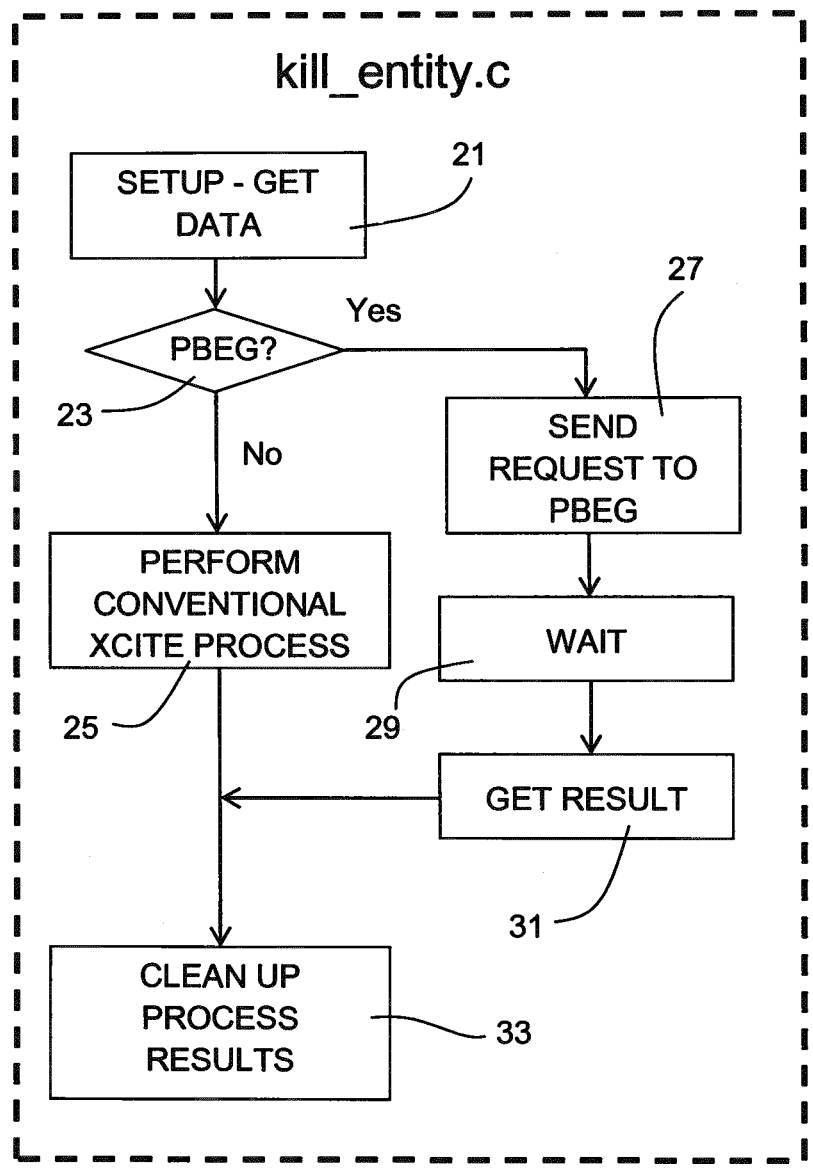
FIG. 9 is a flowchart of a modification made to the XCITE program to interface with the PBEG system for damage processing of a target aircraft.

FIG. 9 shows a flow chart with the functional changes made to XCITE to support PBEG damage calculations. The initial setup and obtaining of data 21 is the same in both the conventional $P_k$ based weapon processing and the physics-based weapon processing. A decision 23 is made whether PBEG processing is available. If not, the $P_k$ process (or another simple process) 25 is executed. If a PBEG system is available, the $P_k$ process is not used, and the system executes a function call 27 to the PBEG interface, which, after a delay during which the host computer waits 29. During this wait period, follow-up calls to the PBEG interface may be made. When the PBEG responds, the results 31 of the weapon fire is received. The result of the PBEG or the $P_k$ process is then integrated into the data of the simulation, with the target vehicle being unharmed, destroyed, or, if PBEG is used, partially damaged. The XCITE Instructor Operator System is able to incorporate the PBEG weapons processing without modification.

A special visualization component within the system of the preferred embodiment performs color coding, and leverages the GPU's graphics capability directly for parallel visualization of the engagement. The visualization system directly renders the wireframe representations of the aircraft and missile throughout the engagement. After the engagement occurs, each part of the plane is colored to reflect the resultant damage level:

Green: No damage;
Yellow: Slight damage;
Orange: Moderate damage;
Red: Part failed or detached from main airframe.

This visualization may use its own network library that it shared with the SAF Driver, and it preferably leverages the hardware's OpenGL capabilities.

Figure 10:
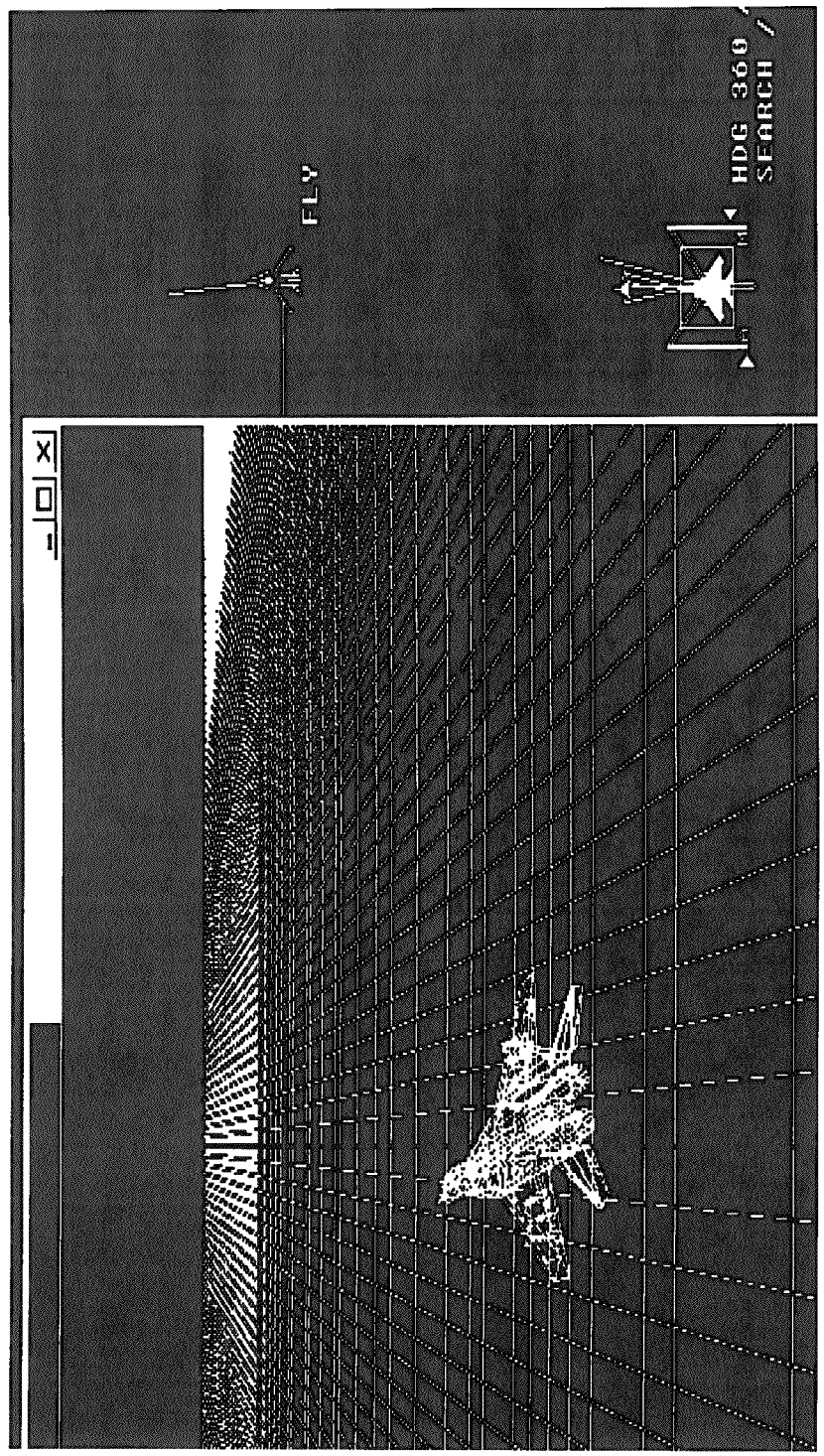
FIG. 10 is a combined view of the PBEG model of a MiG-29 and a diagram of a missile fire engagement.
Figure 11:
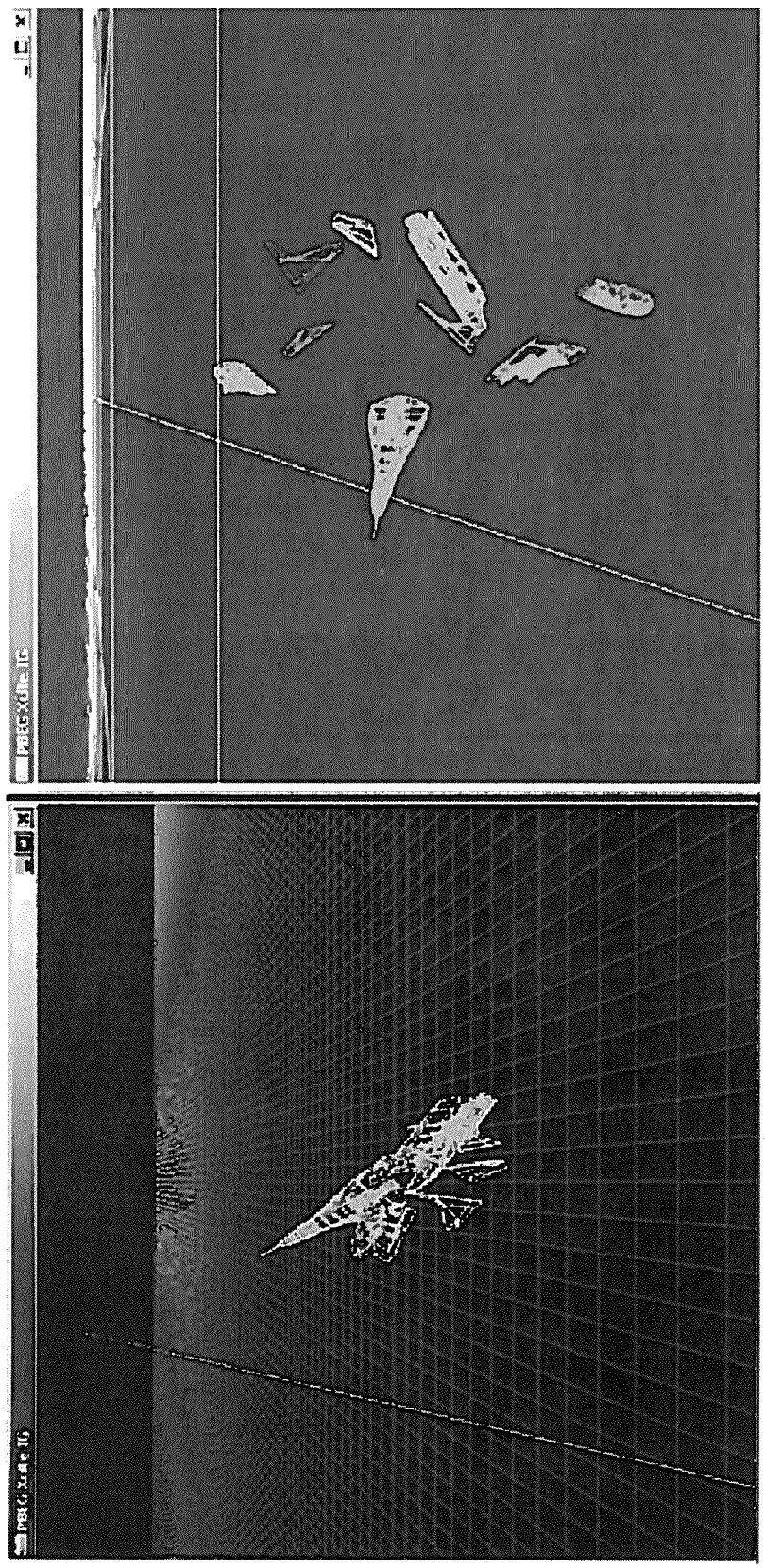
FIG. 11 is a combined view of the PBEG model of the MiG-29 experiencing missile impact and breaking up.

An example of the visualization process is illustrated in FIGS. 10 and 11.

FIG. 11 shows a rendered wireframe of the engagement. The image of the aircraft is rendered in wireframe and in green, because it is undamaged. To the right in FIG. 11, engagement begins. FIG. 11 also shows two views of the appearance of kills in wireframe. The several parts of the aircraft are seen moving independently of each other, and the wireframe view is colored red, because the pieces of the aircraft have experienced severe kill-level damage.

Enhancement of the system herein disclosed is possible. In addition to the foregoing, enhancements of the PBEG system herein shown may be made. For one, in the example here shown, all flow was assumed to be subsonic and the linear drag model used may not be faithful to the actual effects at high airspeeds. A model that included transonic and supersonic airflow may also be employed. The model also may be enhanced by providing for additional secondary consequent damage caused by aerodynamic forces caused by structural bending resulting from a blast. Furthermore, the model here reflected only complete penetration by fragmentation of the warhead. The model may be enhanced by providing for partial damage to aircraft skin, as well.

The time constraint of simulation makes it imperative that a system for simulation work effectively in real time. The engagements of the present examples took approximately three (3) frames, with a fourth frame used by XCITE to manage the simulation results, bringing the total time cost of a frame with damage calculations to approximately 60 milliseconds. The four (4) frames constitute a slight delay that becomes insignificant in the course of a normal operation, due to the extremely low likelihood that any one specific frame requires a damage assessment.

Because the default state is for XCITE to assume an aircraft was alive (this was done to prevent deadlocking in the case that PBEG fails or does not start properly), it is possible that on slower computers the wait period may expire before PBEG has a chance to reply. This can be recognized by PBEG indicating the plane was killed while the plane remains alive in XCITE. The situation can be corrected by either using a more powerful computer to host PBEG or, more practically, by increasing the delay value.

With the system here shown, using a physics-based approach, approximate real-time warhead-damage calculations can be achieved. Physics calculations in conjunction with NVIDIA PhysX are able to capture a more realistic explosion. This physics-based approach allows pilots and trainers to receive near-instant feedback of the effects of ordinance, with measured performance improvements over other approaches for warhead modeling. Additionally, this approach can generate a detailed visualization of the engagement for immediate feedback, as well as pilot debriefing or technical troubleshooting.

A large number of Department of Defense weapons engagement and survivability models exist that can be used to validate present system results, or to derive improved source data. See, e.g., United States Department of Defense, Joint Aircraft Survivability Program (JASP) and the Joint Technical Coordinating Group for Munitions Effectiveness (JTCG/ME), (2010). SURVIAC Model Guide. Incorporating some of these engineering level models into a PPU- or GPU-based framework can yield results usable for a real-time training system application like the PBEG.

Additionally, new aeronautical models for both the missile and aircraft can be developed that allow a more coupled simulation between XCITE and the PBEG, as well as a capability to model aerodynamic forces after a detonation. PBEG may also be used to develop a more robust network damage-server that is capable of servicing requests from multiple XCITEs and simulator hosts simultaneously.

Directed Energy Weapons

Directed energy (DE) weapons, such as lasers or other beam weapons, are used in air combat and anti-aircraft applications. Simulation of these weapons is desirable, but difficult due to various issues. For one, the beam has to stay in contact with the target for some period of time longer than an instant to heat it enough to produce damage. Where there is potentially a great deal of movement by the target aircraft, outcomes may be problematic if there is latency in the system between the directed energy weapon and the target aircraft.

Figure 12:
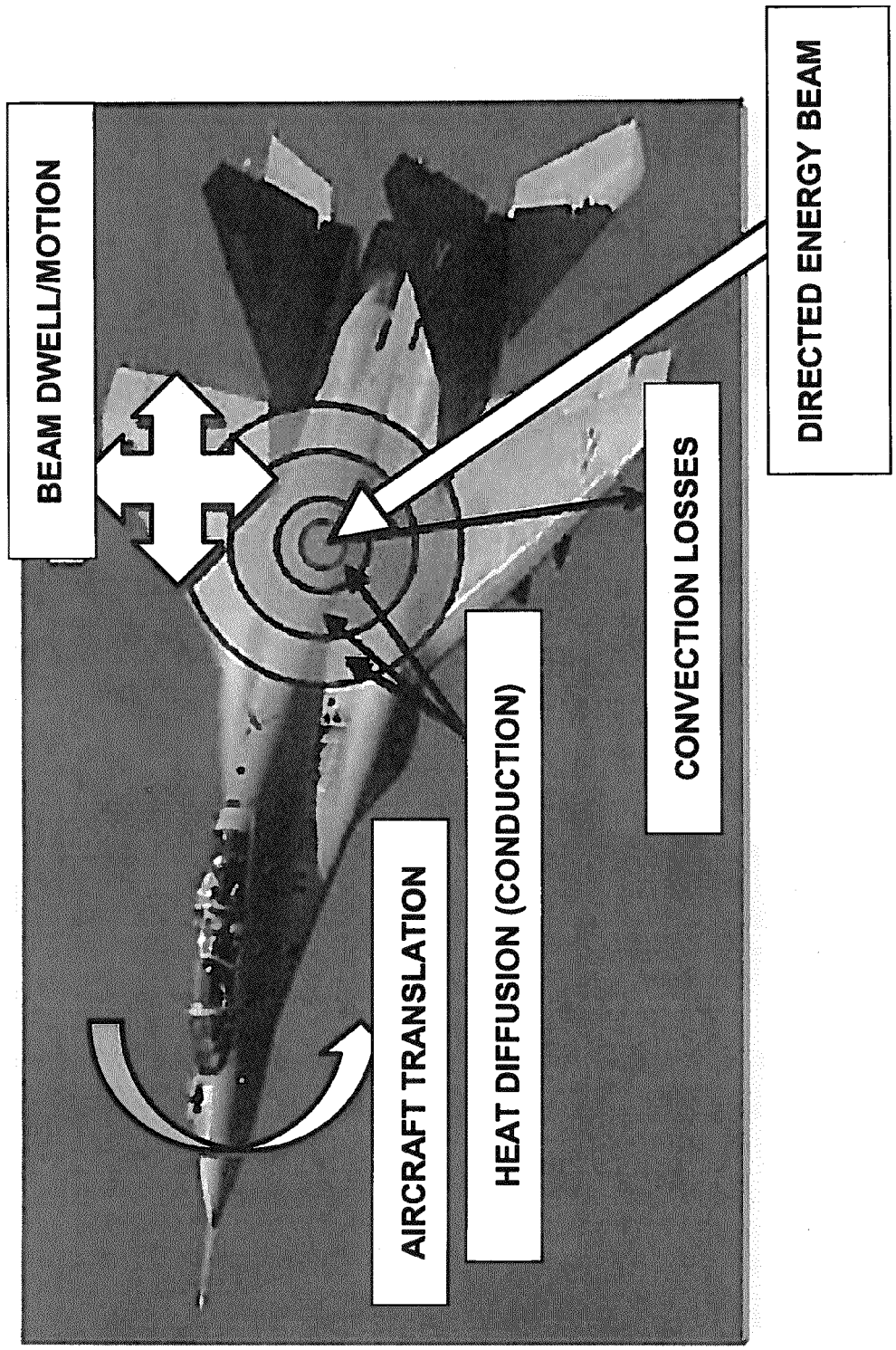
FIG. 12 is a diagram of the effect and influences on a directed energy weapon on an aircraft.

The general issues relating to modeling of directed energy weapons are illustrated in FIG. 12. The directed energy beam strikes an aircraft at a localized point. This point is movable depending on the duration of beam dwell, which is contingent on movement of the beam source, and also on target aircraft translation, both of which will shift the spot of maximum heat delivery.

The heat from the beam hit point diminishes by essentially two processes, heat diffusion (or conduction) and convection. Conduction allows heat to flow into the other parts of the aircraft, reducing the intensity of the peak temperature at the hit point. Convection allows for cooling of the point by heat escaping into the ambient environment.

Figure 13:
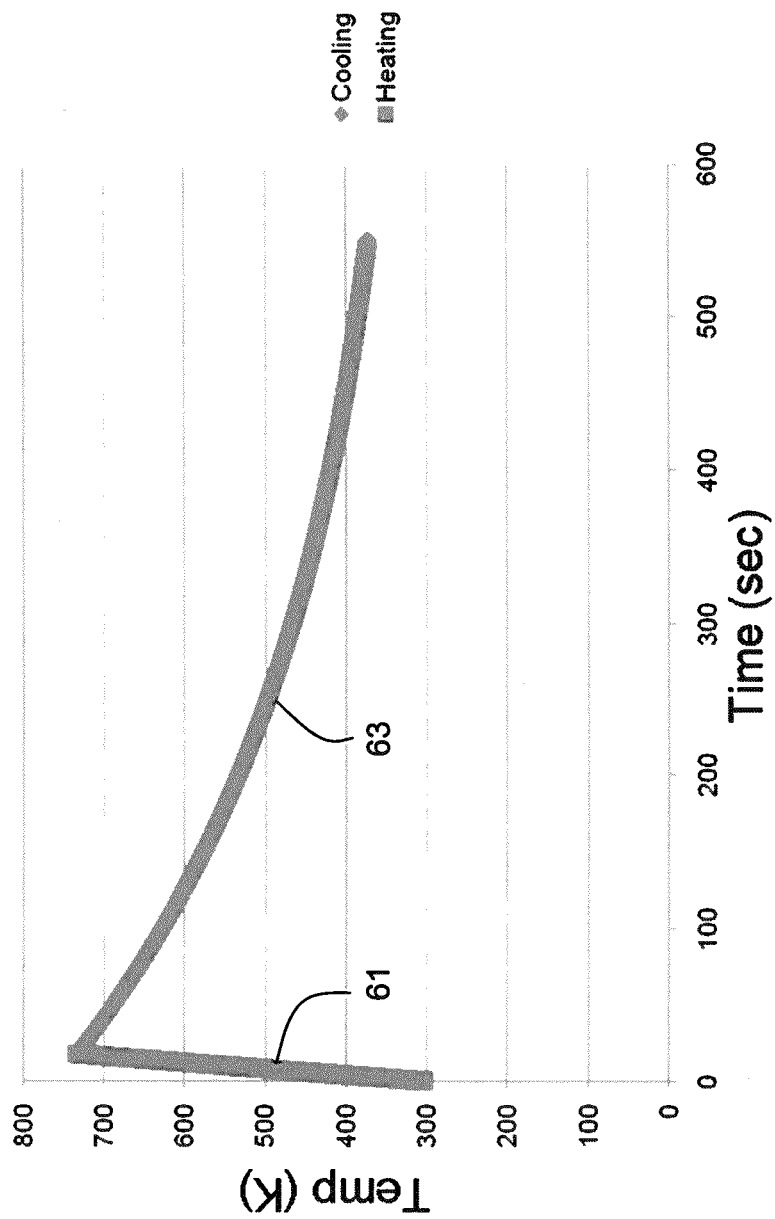
FIG. 13 is a graph of the rates of heating and cooling from a hit by a directed energy weapon.
Figure 14:
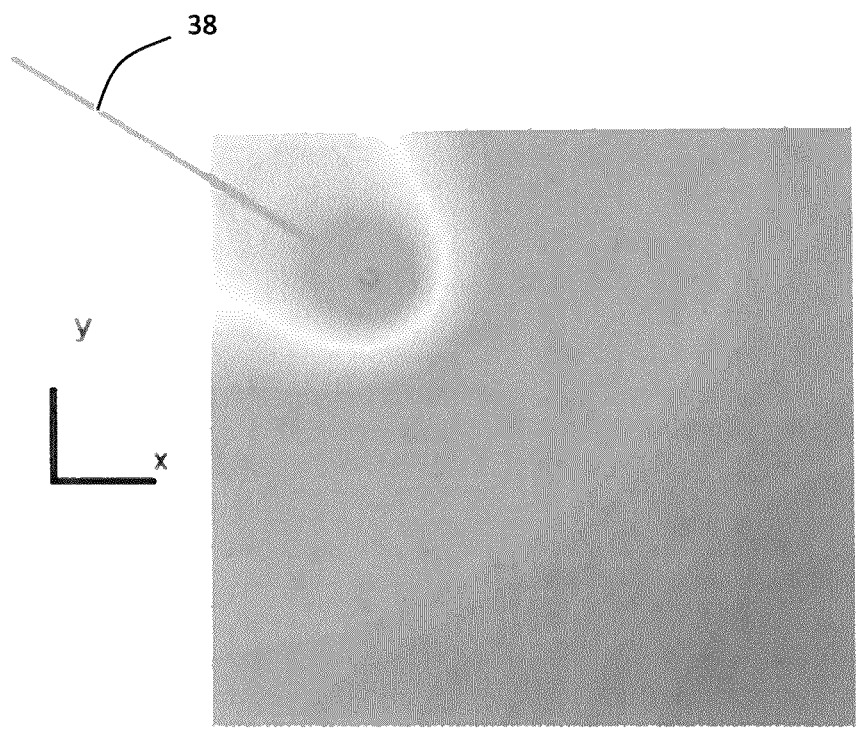
FIG. 14 is an image of heat distribution from a directed beam hit.

As seen in FIG. 13, during the period where the DE beam is striking an object and heating it, the temperature rises very rapidly (see curve portion 61). As soon as the beam is removed, cooling at a somewhat slower rate brings down the temperature of the target. See curve portion 63. A large portion of the cooling heat is by conduction, which diffuses into the surrounding materials, resulting in a temperature profile around the hit point of the beam 38, such as is illustrated in the image of FIG. 14.

It has been discovered that it is possible to use a physics based system to simulate the effect of a DE weapon on a target, with some similarities with the approach taken above with respect to missile engagement modeling. The Physics-Based Environment Generator (PBEG) can also coordinate with the Expert Common Interactive Training Environment (XCITE) to provide physics-based calculations that supplement XCITE simulation calculations during a directed energy weapon encounter. The ray-tracing and graphics-processing capabilities in the GPU make it an ideal platform to model directed energy attacks against dynamically articulating targets in distributed simulations. This feature of the invention leverages PBEG based on Nvidia's PhysX physics engine to calculate the heat transfer attributes and visualization to aid in understanding the results of the encounter, and to provide a real-time feedback of encounters in progress, as will be described below in detail.

The exemplary directed energy weapon used for the present disclosure is an airborne laser, but other beam weapons may be simulated effectively as well.

The exemplary target aircraft for the present application is the Russian made MiG-29, as in the first example above.

As described above, the distributed simulation system relies on an XCITE software suite to run the simulation, generally determining where everything should in the virtual world, and distributing that information (entity states) to an extended PBEG system. The PBEG system comprises a central managing system that communicates with the XCITE simulation programs, and a PBEG physics station at each simulation station. The PBEG management system periodically receives positional data (DIS entity-state physics data units (PDUs)) for virtual objects (also referred to as entities) defining where the entities should be in the virtual world. These entity state PDUs are sent out to all of the PBEG physics stations in the system to maintain synchronization of the entities.

Figure 15:
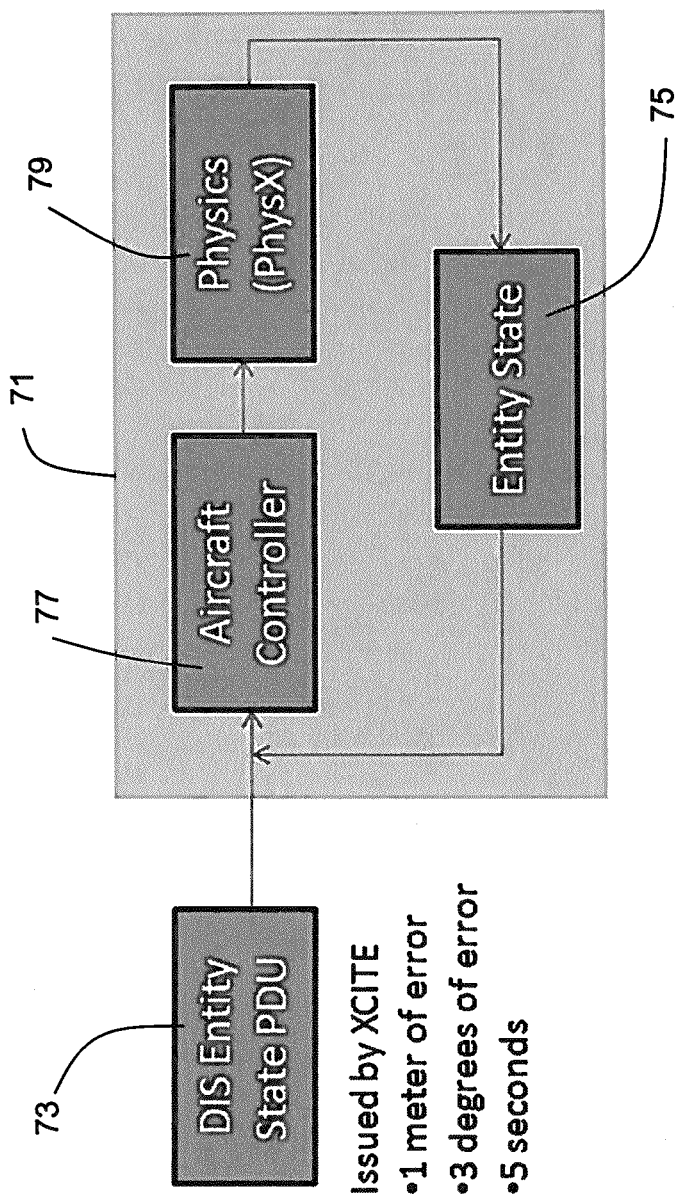
FIG. 15 is a diagram of the processing of entity state PDUs by the PBEG station.

Referring to FIG. 15, at the individual PBEG station, 71, the data 73 is received. It is combined with the current local entity state data 75 (i.e., position and orientation) of the entity. In an aircraft entity, the net difference between the authoritative system-wide position data 73 and the local position data 75 is fed to an aircraft controller 77 that determines what force should be applied to the entity to move it to the authoritative (i.e., master synchronizer) entity state. The force data is passed to the physics engine 79, which determines the result of the physical forces of the PBEG environment defined by the local physics data and the rules of the physics engine. The result is positional data for all entities ort objects in the system, including updated entity state data 75 for the aircraft in question.

Figure 16:
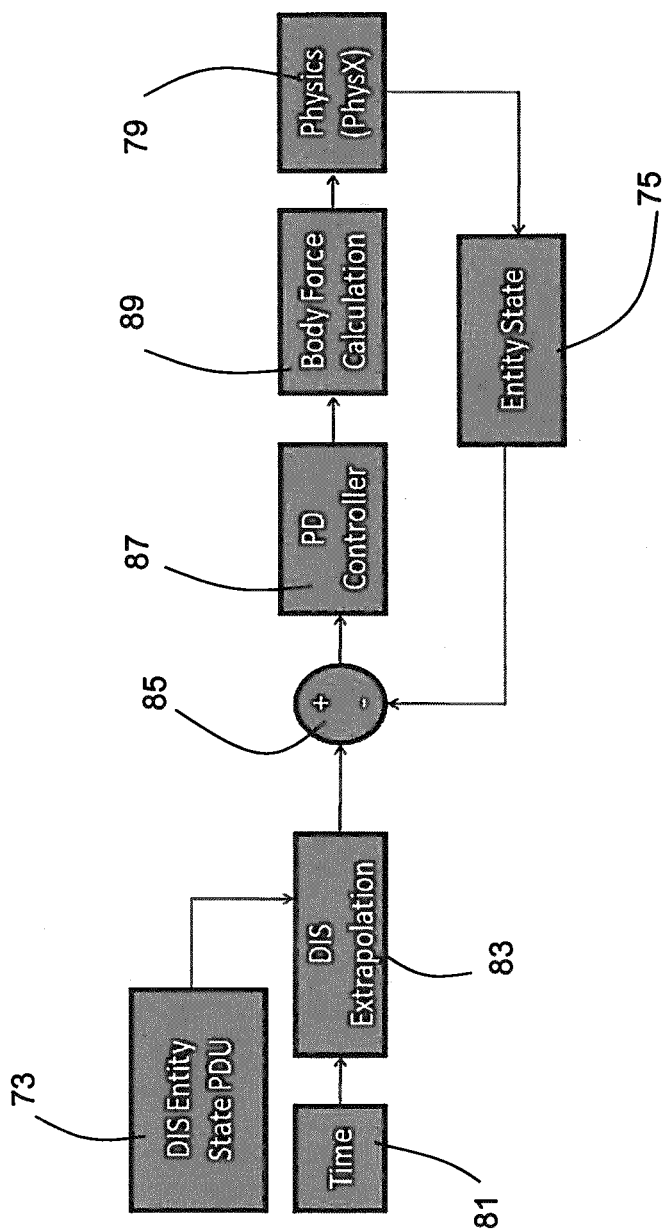
FIG. 16 is a more detailed diagram of the processing of FIG. 15.

FIG. 16 shows this process in slightly greater detail. The DIS entity state PDU 73 is for a specified system-wide point in time. The current time by a local clock 81 is used to extrapolate data 83 defining the correct position of the entity at the present point in time. This data is compared with the current entity state 75 at comparator 85. The result is sent to the aircraft controller, which typically includes a PD controller 87 and a computerized body force calculation module 89 converts the PID control output into force for application to the aircraft entity. That is transmitted to the physics engine 79 as above.

Figure 17:
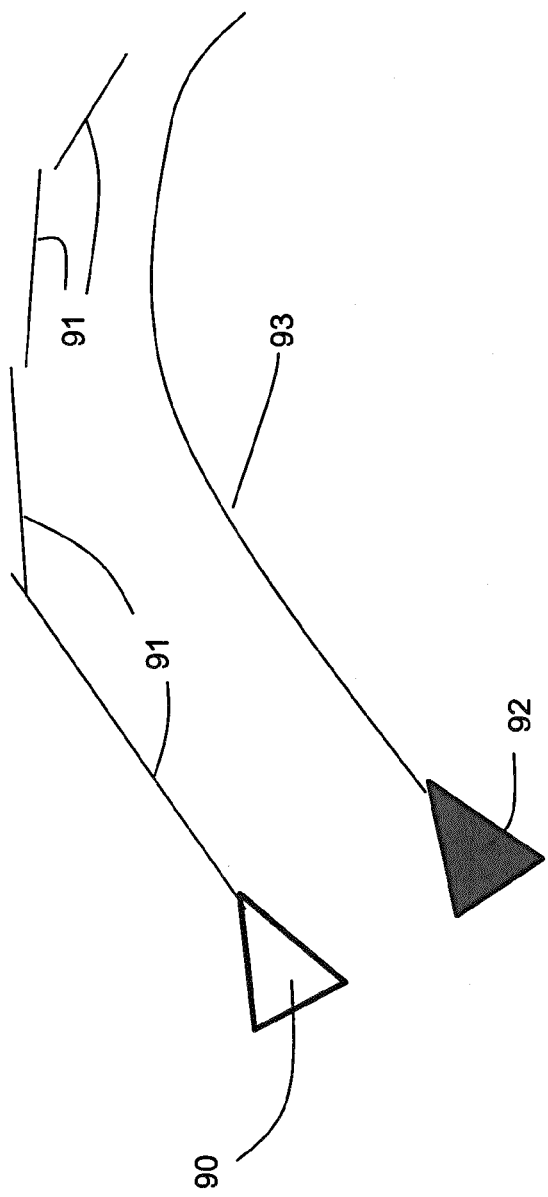
FIG. 17 is a diagram of the actual PBEG position of an entity and the entity state directed by the DIS PDUs.

The result of this process over time is illustrated in FIG. 17. The system wide DIS entity position 90 is transmitted generally as a series of segments 91 of movement to the PBEG. The PBEG applies these serial updates entity state PDUs to its local physics engine, which causes the entity 92 in the simulator station, per the local PBEG scene data to move smoothly along a physics-constrained course 93.

The modeling of the directed energy weapons fire relies on PBEG as a multipurpose, physics-based calculation node that is used in this study to perform thermal calculations for XCITE. The PBEG uses commercial off-the-shelf physics engines to model the damage associated with the directed energy weapon in a way that has similarities to the processing of an aircraft/missile engagement. PBEG provides NVidia PhysX physics engines for its physics calculations, and provides a convenient interface to a real-time physics world. Anything that is simulated in PBEG, such as thermal calculations, are all translated into PhysX and solved real-time. PBEG resides on the DIS network and interacts with other components via DIS packets.

Figure 18:
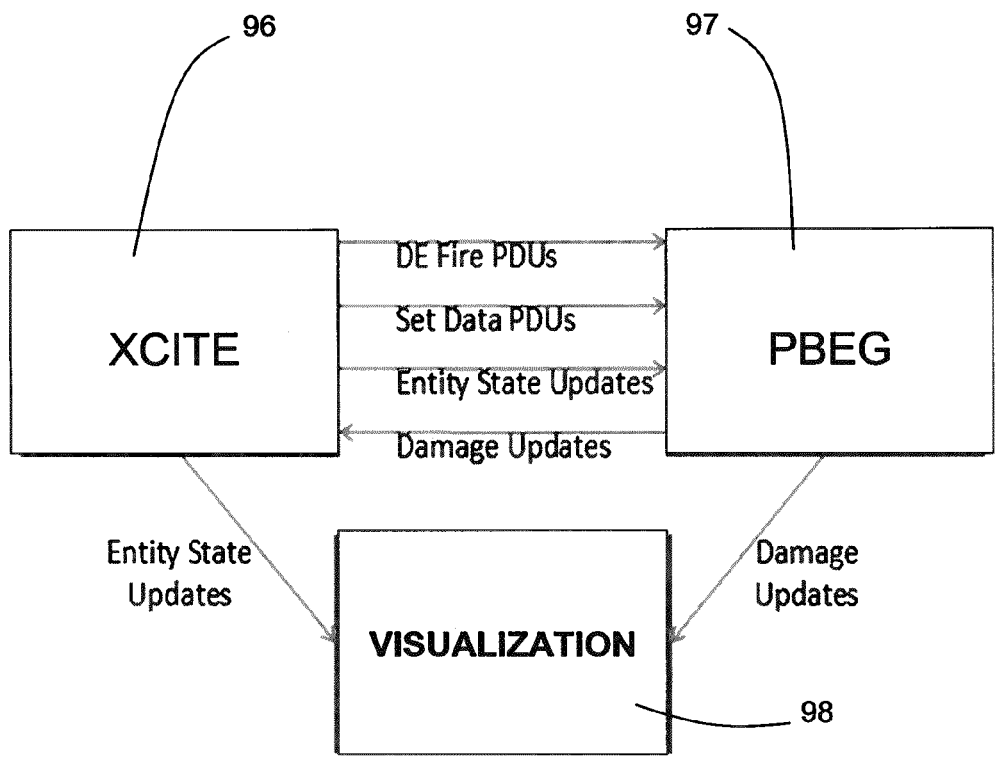
FIG. 18 is a system block diagram showing the interaction of the XCITE, PBEG and visualization modules of a system according to the invention.

FIG. 18 shows an overview of the DE weapon simulation architecture. The XCITE module communicates with the PBEG system 97, sending it three types of data PDUs: Entity state updates of where entities are supposed to be in the virtual world, set data PDUs that create entities in the world or change their properties as it were manually, and DE fire PDUs, which define a DE beam by its source, direction, power, etc. The PBEG system 97 makes determinations with this information of the results of missile engagements, as has been discussed above, and also the results of DE weapon fire, producing as a result damage updates. These are returned to the XCITE module 96 for incorporation into the entity states of any relevant entities. The damage updates are also transmitted to the visualization module 98, where they are integrated into the display shown to the various users of the simulation stations if applicable to their view, usually color coding damaged parts in red or orange, as discussed previously in regard to the missile detonation models.

XCITE usually performs the lion's share of simulation activities, relying on PBEG mainly to distribute the results of its simulation and integrate them smoothly across the simulation system by the extended physics farm. The general principle of the modeling of the present invention is to offload the computationally heavy workload required to manage complex models at runtime.

The offloaded work uses models that rely on ray casting, DIS extrapolation "popping", and heat transfer equations separate from the machine hosting the XCITE application. This transfer of computational duties allows XCITE to maintain the entities created under its control. The entire process is achieved through a carefully designed interface between PBEG and XCITE which permits them to pass data using DIS Set Data PDUs, which XCITE always reflects as normal DIS 200-X PDUs.

The system of the preferred embodiment includes and relies up installation of the new DIS 200X Draft 14, XCITE 5.1, PBEG 3.0, an aero controller developed in cooperation with the University of Central Florida, and PhysX 2.81, all of which are leveraged to provide a coherent system that is capable of accurately modeling a DE (directed energy) encounter.

The system software is configured such that XCITE and ThreatIOS are paired together to provide a DE capable SAF (Self Actuated Force) (XCITE) with an easy to use GUI front end (using the ThreatIOS module) through which an operator can make inputs to the system that configure its operations. The XCITE and ThreatIOS capabilities are split up between two computers, each of which is configured to the local DIS network. Additionally, inside ThreatIOS, the user can specify PBEG stations which are to be used later to calculate heat transfer attributes. XCITE/ThreatIOS provides three PBEG slots for different PBEG stations to be connected to the network, although this may be expanded. Each of these PBEG slots represents a station that can be used to do DE calculations.

In order to provide accurate thermal calculations for modeling a DE weapon, as mentioned above, PBEG requires a stable platform for which raycasting can be performed. DIS smoothing is achieved by introducing an advanced flight controller that smoothes the jumpy movement that leads to jitter. This stable platform provides a steady aim point for raycasting, solves for line of sight, and is beneficial for a laser aiming algorithm. After raycasting has determined the exact location of the laser beam hit PBEG will then consult the model to determine component ID and the parts' unique thermal characteristics. PBEG then runs its thermal analysis and determines damage level that is reported to XCITE.

DE Thermal Processes

When a DE encounter occurs, there are two different thermal processes that must be considered.

The first process that occurs during a DE encounter involves increasing heat associated with the target vehicle where the DE beam contacts the surface. The second process that occurs involves cooling down the vehicle. As the target vehicle maneuvers on its course, the DE beam contact point can move, which causes the previously heated platform parts to begin cooling down. As seen in FIG. 13, most of the time spent in the thermal process is in the cooling phase (63); however, the most important part for determining damage sustained is the heating phase (61).

Data for the model was collected for 1 mm thick carbon steel that had been hit by a megawatt class laser at range. For this example, it took approximately 17 seconds to heat the metal to 730 degrees Kelvin and then 530 additional seconds to cool within 30 degrees of the ambient temperature.

In the preferred embodiment, a linear simple heat-transfer algorithm was employed, although a more complicated algorithm may be derived and employed as well. With that said, the linear heating algorithm herein is able to correlate fairly well with public data on DE weapons, yielding near similar temperatures after predetermined time periods.

Once the linearized thermal equations were determined, they were converted to a mechanical analog, i.e., a model that emulates the thermal heating and cooling process expressed as an analogous process of mechanical activity in order to model the thermal processes using the PhysX engine of the PBEG station performing the calculations.

Once the model is set up as a parallel physics/mechanical system, the heating and cooling processes during a DE encounter can be accurately modeled using a PBEG physics engine.

It will be understood that the mathematics herein is provided to show one of ordinary skill in the art the operation of a computer system that supports the methods and systems of the present invention, all of which operate at high speed in real time, and rely purely on electronic data processing by computers.

Heating Process

The equation to use for calculating temperature during the heating process takes into account only one of the three ways to transfer heat, these being conduction, convection, and radiation. Based upon research and calculations, it was seen that during a DE engagement heating process, the heat transferred to the piece due to convection and radiation are negligible (account for about 0.1% of the total temperature). Therefore, the temperature change due to the DE weapon heating process can be modeled using the conduction equation EQ (5) below, while convection and radiation are ignored for heat calculation.

$$\Delta T = qR_{cond}, \text{ where } R_{cond} = \frac{L}{kA} \qquad \text{EQ (5)}$$

wherein $R_{cond}$ is resistance to heat conduction transfer.

Based on the thermal heating equation, an analogous mechanical system can be determined that will allow for processing of the heat transfer in the target aircraft. Starting with the conduction equation EQ (5) and first applying an electrical analog, Ohm's Law EQ (6) is obtained. From EQ (6) the mechanical system analog can be applied, giving an equation for velocity based on force and friction EQ (7).

$$\Delta T = qR_{cond} \rightarrow \Delta V = iR \qquad \text{EQ (6)}$$

$$\Delta V = iR \rightarrow \Delta \text{Velocity} = f\frac{1}{B} \qquad \text{EQ (7)}$$

To apply the above analogs and model the heat transfer as a mechanical physics process, the change in temperature is equivalent to the change in velocity, the heat flux is equivalent to force, and the conductive resistance is equivalent to inverse friction.

To use this mechanical analogue, the corresponding analogous equations for force and friction during a DE encounter are used. It can be determined that the force is equivalent to the DE beam power absorbed by the target vehicle during the heating process.

$$f = \text{Power} = \frac{IA\alpha}{2} \text{ where, } \alpha = 1 - \varepsilon \qquad \text{EQ (8)}$$

In EQ (8), I is the peak intensity of the DE beam with units of watts, A is the area of the DE beam on the target in square meters, $\alpha$ is the absorption of the target vehicle material, and s is the emissivity of the target vehicle material. The other quantity that must be determined is the friction for the heating process. Since the inverse friction is equivalent to the conductive resistance, the equation becomes EQ (9)

$$\frac{1}{B_{heat}} = \frac{L}{kA} \qquad \text{EQ (9)}$$

In EQ (9), L is the length in meters, A is again the area of the DE beam in meters squared, and k is the thermal conductivity in units of W/mK. Plugging EQ (8) and EQ (9) into EQ (7) gives the final mechanical analogue used to compute the equivalent change in temperature during the heating process as shown in EQ (10)

$$\Delta T = \Delta \text{Velocity} = \frac{IL\alpha}{2k} \qquad \text{EQ (10)}$$

The mechanical model created is a separate environment from the virtual world of the simulation. Internally within the PBEG station, the mechanical model is passed to the physics engine with mechanical data that is related to a change in velocity in the same way that the thermal data of the simulated target part and the DE weapon is related to the change in the target part temperature.

The mechanical model is that of a box on a friction plane being moved in one direction. The velocity of the box represents the temperature of the target part. The force applied to the box is an analogue of the heat applied by the DE weapon to the target part. The more force is applied to the box, the faster it moves, and the more heat energy is delivered to the target part, the hotter it gets.

The mechanical aspects of the box analogue model, i.e., the mass and/or dimensions of the box, the friction of the surface, etc. are predetermined data values of the mechanical analogue model that correspond to thermal properties of the target part, and the value of the change in velocity is equal to (or can be converted by scaling to) the change in the temperature of the target part.

The value of the heat flux is provided to the physics engine of the assigned PBEG station as data defining a force applied to the box in the friction model, and the physics engine, responsive to this input, will indicate the change in velocity of the box on the friction surface of the model. The difference of the velocity of the object that has occurred will be the change in temperature of the target part in the larger XCITE/PBEG simulation.

MATLAB was used in the creation, testing, and validation of the heating model used. Specialized toolboxes were used as well as linearization techniques to develop a quick, yet accurate model. FIG. 14 shows the calculated effects of a high temperature point heat source being introduced onto a cool metal sheet. The heat spreads as shown, with the circular point being the highest temperature and the darker gray scales at the lower right of the figure being close to ambient temperature.

Cooling Process

The equation for the cooling process again takes into account the fact that the time needed to cool a target vehicle part by radiation and conduction is negligible. Therefore, the cooling process is modeled using only convection using equation (EQ 11).

$$\frac{dq}{dt} = -h_{conv}A\Delta T \qquad \text{EQ (11)}$$

Based on this thermal model for cooling, the analogues from EQ (6) and EQ (7) to determine the mechanical analogue for the cooling process, EQ (12)

$$f\text{=cooling=}\Delta\text{Velocity}*B \qquad \text{EQ (12)}$$

In EQ (12), T is the current temperature in Kelvin, f is the force in watts, and B is the cooling friction which is defined in EQ (13).

$$B_{cooling}=Ah_{conv} \qquad \text{EQ (13)}$$

After solving for the force or change in watts in EQ (12), that value is plugged back into EQ (11) to calculate the change in temperature.

This change in temperature corresponds to the amount the temperature cools for the first second. Therefore this change in temperature can be subtracted from the difference in temperature between the piece and the ambient temperature. Once the new difference in temperature is calculated, that value is plugged back into EQ (12) and the process for solving for the force starts over again. By doing this iterative or circular calculation at 30 hertz (shown visually in EQ (14)), the temperature due to cooling at any point in time can be determined. It also allows a determination of how long it will take the target piece to reach the ambient temperature after it has encountered a DE beam.

$$f = \Delta \text{Velocity} * B_{cool} \rightarrow \Delta \text{Velocity} =$$
$$f \frac{1}{B_{heat}} \rightarrow f = \Delta \text{Velocity} * B_{cool}$$
EQ (14)

The mechanical model of the box on a friction surface is used as an analogue here as well. This is readily understood from the general observation that once the beam is not heating the target part, the force on the friction box is gone, and it begins to decelerate, i.e., there is a negative change in velocity. Correspondingly, there is a drop in temperature once the DE weapon is not firing at the part. Moreover, the relationship of the temperature to the velocity is more conforming than a mere monotone between the functions. As has been set out here, the relationship of the force input to velocity of the friction box model tracks closely with the relationship of the heat flux value to the temperature of the target part.

The mechanical parameters for the friction box model for cooling, e.g., the mass of the box, the level of friction, etc. may be different from the parameters for heating. The parameters of the models are to be selected based on the foregoing conduction and convection equations and functional relationships.

Aircraft Model

Internal to PBEG, aircrafts are modeled using a specialized aero controller that smoothes the simulation of the aircraft between DIS Entity State PDUs. The standard DIS thresholds of 1 m in linear coordinates, 3 degrees in orientation, or 5 seconds allow too much error to be introduced into the calculations when dealing with high precision laser/directed energy encounters using the standard dead reckoning methods as detailed in appendix B of IEEE 1278.1.

The definitive position (i.e., the position defined by the master synchronizer) of the entities is maintained in XCITE. However, an accurate, continuous time-domain version of the position is required for use by the computer system that is determining operation of the DE weapon running the software of the directed energy module. As discussed above with respect to FIGS. 15, 16 and 17, PBEG uses the input from the periodic Entity State PDU to drive a "virtual leader" to which the physical representation of the entity is driven via the aerodynamics module every step of the simulation.

FIG. 17 shows the continuous nature of the position of the entity in PBEG despite discontinuous inputs from the periodic Entity State PDU inputs. While the Entity State PDUs can vary in position by several meters, PBEG is constrained to a continuous signal via the use of a dynamics (physics) engine. The dynamics of the entity are driven by a closed loop controller to the positions indicated by the most recent Entity State PDU so PBEG maintains positional continuity while converging to the correct position, as shown in FIG. 15. FIG. 16 shows the Aerodynamics Block in which a basic PD controller 87 is used initially to cause the convergence of the output to the current "ground truth" position as reported from XCITE via the Entity State PDU. Body force computations 89 are followed by aerodynamics calculations to arrive at a final set of forces that are given as input to the physics system 79. The result is a continuous time signal of position and orientation that closely follows the discontinuous signal provided by XCITE, as seen in FIG. 17.

A basic PD controller 87 is used to control the flight of the aircraft with the data outputs of the controller being used to cause the virtual aircraft entity to track the desired trajectory of the target vehicle. The specific equations used for the calculations are:

$$u_x = k_p[x_d - x] + k_d[\dot{x}_d - \dot{x}]$$
EQ (15)

EQ (15) is the equation of the PD controller corresponding to the canonical form of the dynamics system. The same equation can be used to derive $u_y$ and $u_z$. The output of the PD controller is then used as an input where the flight control is calculated. The flight control equations are used to calculate data values for thrust (EQ (16)), the load factor (EQ (17)), and the deflection angle (EQ (18)) of the aircraft.

$$T = mg[\sin\vartheta(g + u_z) + \cos\vartheta(u_x\cos\varphi + u_y\sin\varphi)]$$
EQ (16)

$$n = \frac{1}{g\cos\delta}[\cos\vartheta(g + u_z) - \sin\vartheta(u_x\cos\varphi + u_y\sin\varphi)]$$
EQ (17)

$$\delta = \tan^{-1}\left[\frac{u_y\cos\varphi - u_x\sin\varphi}{\cos\vartheta(g + u_z) - \sin\vartheta(u_x\cos\varphi + u_y\sin\varphi)}\right]$$
EQ (18)

In EQ (16) thru EQ (18), g is the gravity constant, v and ϕ are the Euler angles, and m is the mass of the aircraft in kilograms.

Once the data of the flight control quantities are determined, they are passed into the physics engine which then updates the entity state as seen in FIGS. 16 and 17.

Operation of Modeling

Figure 19:
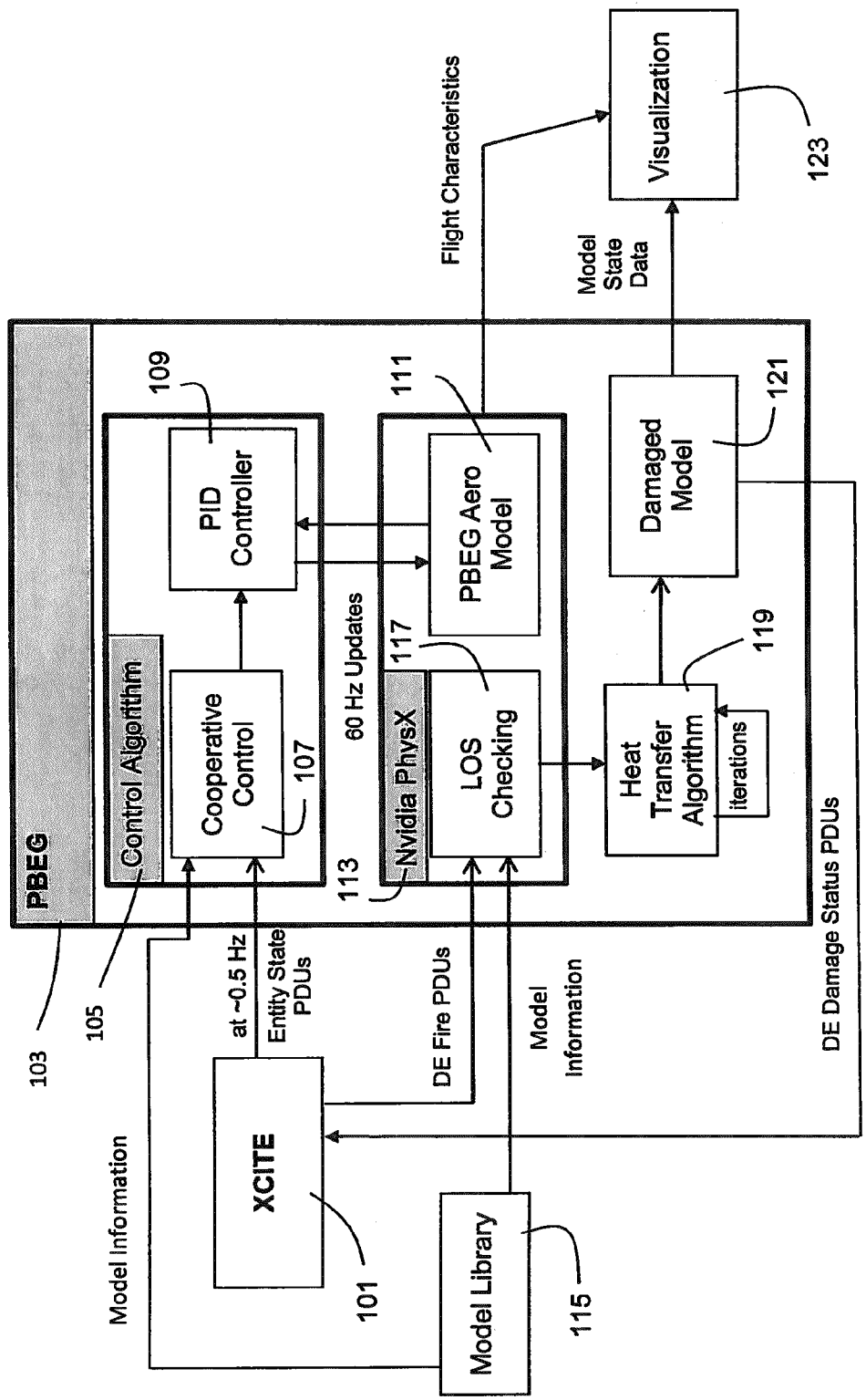
FIG. 19 is a detailed diagram of the interaction of XCITE with the architecture of a PBEG station.

Referring to FIG. 19, the operation of the PBEG station involved in the DE weapon engagement modeling is shown.

The XCITE system 101 controls the simulation in terms of where all the virtual objects in the simulated environment are supposed to be. It transmits entity state PDUs to the PBEG system 103 periodically, e.g., at 0.5 Hz. These PDUs are received by the control algorithm in a cooperative control 107 such as discussed above in regard to FIGS. 15 and 16, in that the desired DIS state is provided and the local PBEG station 103 tries to comply as best it can subject to the physics rules. This is done by giving the PID controller 109 the data indicating the deviation of the DIS state from the entity state in the local PBEG station 103. PID controller 109 smoothes the deviation and passes the data on the PBEG aero model operating in the physics engine 113. The aero model implements a corrective action and returns the new entity state to the control algorithm, as has been described.

In the event of DE weapon fire, XCITE sends PDUs defining the fire in terms of power and direction directly to the PBEG physics engine 113, which also receives the model of the target aircraft from the model library 115, which may be any kind of computer-accessible memory device. The model is preferably a model as describe above in respect to the MiG-29, i.e., a model made up of aircraft pieces each comprising a number of subsidiary parts each having physics data associated therewith for damage assessment.

The physics engine 113, especially the NVidia PhysX or a similar engine, has substantial computational capacity for high speed ray tracing or ray casting with its internal GPUs. The ray casting determines by line-of-sight checking 117 what part of the target aircraft model, if any, the DE weapon has struck.

If there is a contact, XCITE relinquishes authoritative control of the target aircraft entity state to the PBEG station 103, which now determines where the target aircraft is and what its condition is by a local heat transfer algorithm 119, which operates iteratively as described above using the mechanical model of a box on a friction plane, loaded with parameters appropriate to the part or parts of the aircraft being hit by the DE beam to correspond to the temperature change caused in the part(s). The heat transfer algorithm yields a resultant state of the part(s) and these are integrated into the damaged model 121 of the aircraft if there is damage.

Damage is assessed based on the temperature of the part exceeding a predetermined maximum threshold temperature; this may be partial or total damage of the part, depending on the temperature and the predetermined level(s) of temperature that can cause such damage. The damaged model 121 may constitute destruction of the aircraft or partial damage, depending on the condition of the pieces of the aircraft in the model, as discussed above with respect to missile damage assessment.

The damage status is sent back to the XCITE system 101, which takes over and reassigns authoritative control of the aircraft again, such as to one of the simulator stations 7 that is flying the target aircraft. The damage is also transmitted to a visualization module 123 that creates a displays for the simulation that shows the damage to the aircraft in colors or other visible alert formats. Flight characteristics of the damage to the aircraft may also be displayed in some special way by the visualization program 123.

This architecture processes the missile engagement described previously as well. XCITE 101 sends PDUs indicative of a missile engagement and passes control over to the PBEG. The LOS tracking 117 of the physics engine 113 checks the trajectories of the fragments of the missile if there is detonation near the target aircraft, and determines which parts of the target, if any, are struck. Lines of sight are also drawn by the LOS checking 117 from all the parts of the target aircraft model to the missile detonation site to ascertain those parts of the target that are subjected to blast pressure.

Figure 21:
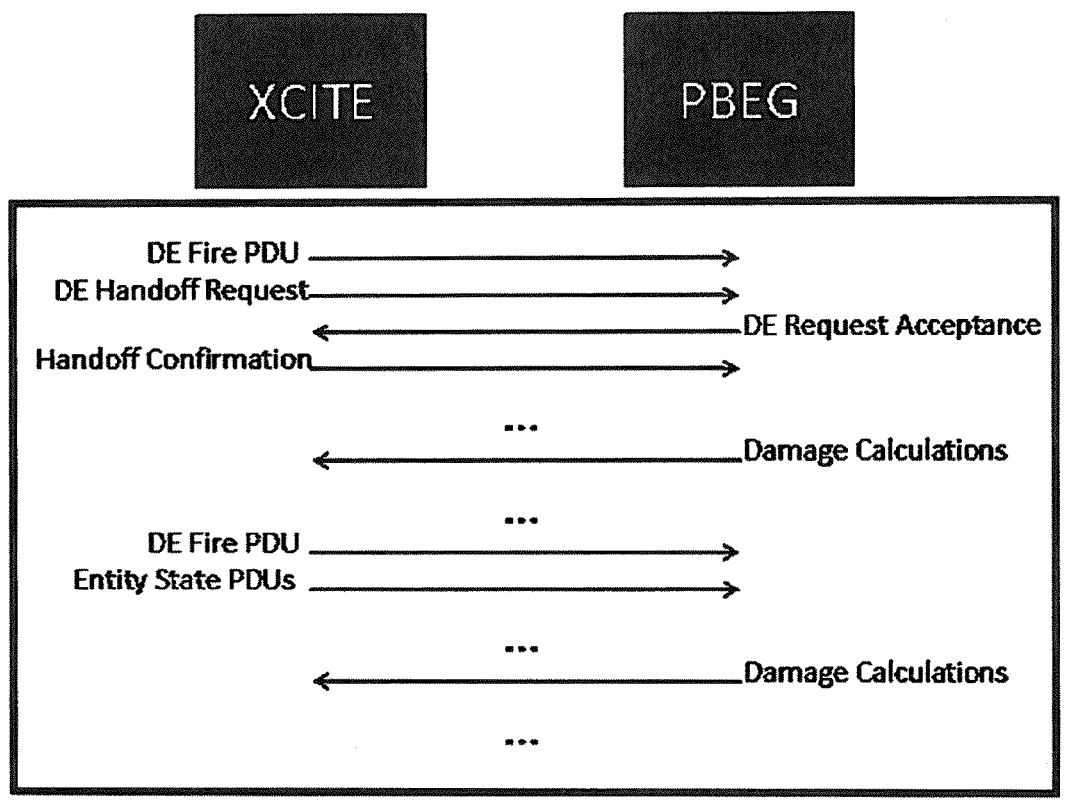
FIG. 21 is a diagram showing the communications between the XCITE and PBEG modules during a directed energy weapon firing.

XCITE and PBEG have fairly simple set of interactions as shown in FIG. 21. XCITE and the DE weapon PBEG station 103 are configured to have special interactions that occur inside of DIS Set Data and DIS Data PDUs that represent Handoffs, Handoff Confirmations, Damage Updates, and Damage Update Confirmations.

XCITE initiates the encounter in two ways, first a DE Fire PDU is sent out, followed immediately by a DE handoff request intended for PBEG. PBEG returns a DE Request Acceptance Set Data PDU if it is online and willing to accept the transfer request, otherwise the request is ignored. XCITE will then acknowledge a properly sent request and offload calculations to PBEG.

At this point the encounter is in full swing and PBEG accepts from XCITE periodic entity state updates and periodic DE Fire PDUs carrying updated data or heartbeats. PBEG provides to XCITE updated damage calculations every time they are computed—at approximately 30 hertz. PBEG provides damage status PDUs to XCITE for every component affected by the DE encounter. The data provided includes current temperature, as well as a damage level, which represents the current temperature change of the component divided into the max change before the part is deemed as failed. The damage level is then fit into the range of 0 to 4, where 0 is no damage and 4 is completely destroyed.

XCITE first provides DE Fire and Entity State Updates to PBEG passively via the DIS interface, the system that links these two components of the overall system. These PDUs are also read by the visualization and used to populate the visual environment. The visualization also receives PBEGs damage PDUs and the model state inside of the visualization represents what PBEG believes the damage status of the entity is. This is done because the damage data provided by PBEG is of more detail than what DIS specifies to be put out in the Entity Damage Status PDUs.

XCITE is responsible for maintaining the simulation state and telling PBEG where the beam is aimed. The DIS PDU specifies the target location for the beam, but does not consider orientation and line-of-sight issues. The DE Fire PDU is followed by a DE handoff request from the XCITE module to the PBEG station.

The PBEG sends back a handoff confirmation, and then determines which piece (or part) of the target aircraft is hit and performs thermal assessment on the actual target, not the intended target. The PBEG physics engine is used for the task of determining which piece is hit. Each component is tagged with model data and dynamically loaded inside of PhysX (the physics engine) as soon as the first DE Fire PDU is received. PBEG performs raycasting inside of PhysX and determines what part is currently being hit with the center of the beam.

At this point, PBEG searches through an internally maintained list of previously hit parts to determine if the beam is dwelling close enough to a previous hit that most of its thermal energy will be in that region. If there are no nearby previously hit parts, PBEG starts a new hit location event, which is a point that is associated with a temperature. If a beam hit is deemed to be on a previous beam hit, the previous hit location event data is loaded and compounded with the new energy. A beam hit is determined to be inside of a previous hit if the center point of the new hits falls anywhere in the area of the previous hit.

Figure 20:
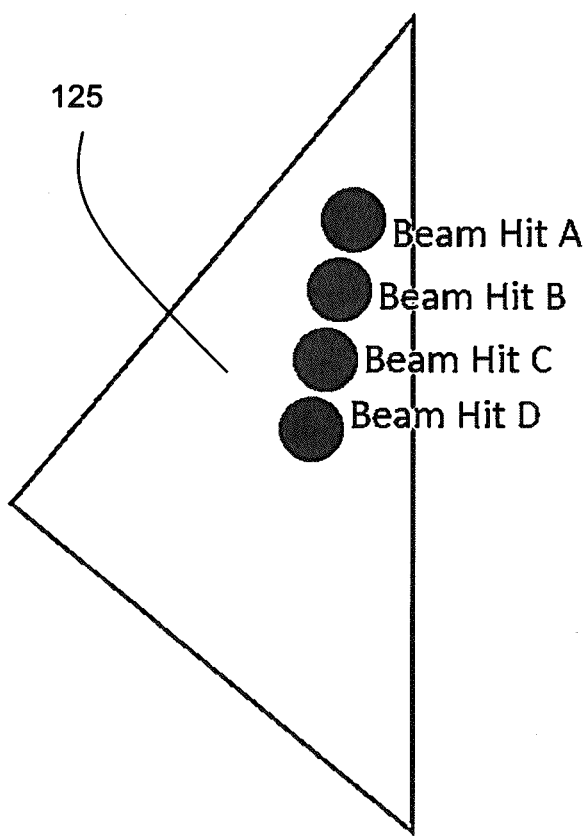
FIG. 20 is a diagram showing multiple directed energy beam hits on a single part of an aircraft.

While the model is made up of a static number (10 in the case of the MiG-29 model) of major components or pieces, any region on the aircraft can have a DE beam hit it, in which case what is referred to above as a "previously hit part" is in fact a circular area with a diameter matching the beam diameter. As shown in FIG. 20, large pieces, such as wing structure 125 can have many areas that are hit on them. The damage level of a component is determined by inspecting each beam hit and returning the level of the most damaged beam hit area.

Where a shooter is following directly behind an enemy fighter, the shooter attempts to aim its directed energy weapon at the nose cone of the enemy aircraft. Due to the orientations in space of the two aircraft and their local body frame orientations, it is impossible to hit the nose cone of the front aircraft. PBEG recognizes this situation and, because it is raycasting against accurate geometry, PBEG will correctly conclude that the real position of the dwelling beam is somewhere on the back of the enemy aircraft near the tailpipe.

As seen in FIG. 21, the PBEG returns damage calculations to the XCITE module.

Subsequent firing events of the DE weapon are transmitted as DE fire PDUs and entity state PDUs are supplied for the aircraft involved based on the earlier damage calculations. Subsequent damage calculations are returned by the PBEG to the XCITE module. Handoff to PBEG is released to XCITE when the firing ceases.

PBEG maintains and stores all hits and previous hits are stored as temperature and point pairs. Each frame all of the points are checked and cooling is applied. If a piece is being hit by a DE beam it is not cooled and instead the heating algorithm is executed on it. PBEG will continue cooling parts until they reach the ambient temperature.

The DE encounter is terminated once XCITE receives a component at damage level 4 (complete destruction), at which point it will send out Damage Status PDUs reflecting the damage, a DE Fire PDU with the weapon state set to off, as well as a Detonation PDU for legacy systems.

Visualization

The visualization module is an OpenScene Graph powered environment that can read both DIS and damage outputs published by PBEG. Visualization features a full world synthetic database and can process any DIS entity that it has a model for. It features a convenient damage display which shows each part that has been affected, its current temperature, the position in entity coordinates of the hit (x,y,z), and the number of seconds of dwell the DE weapon had on each particular piece. The visualization also has a white line that goes from the front of the laser source onto the target at the location that is currently being hit. The laser line is a rough approximation, and PBEG is the final authority on beam hits, however, the data displayed in the damage display is the current and accurate results of the encounter in progress.

Figure 22:
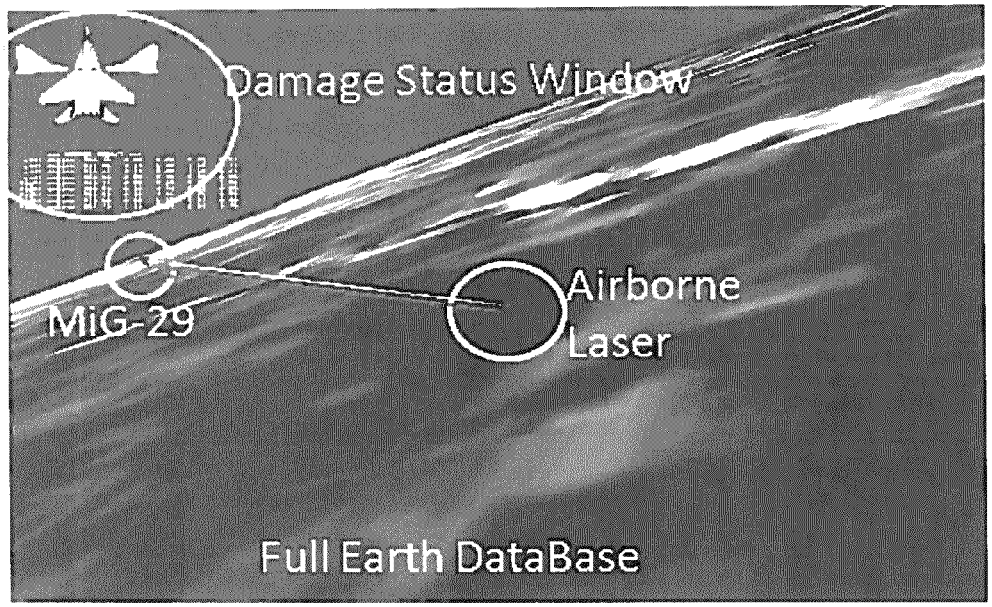
FIG. 22 is an out-the-window view of an exemplary engagement with a target aircraft in a system according to the invention.
Figure 23:
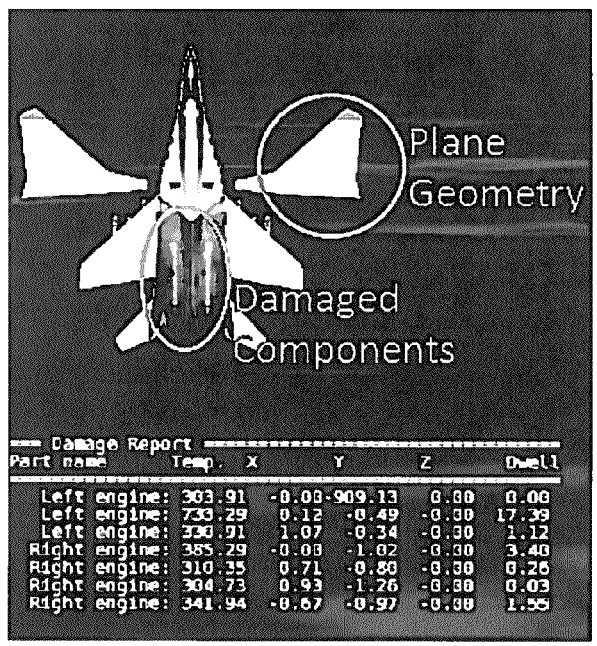
FIG. 23 is a detailed view of the heads-up display portion of the view of FIG. 22.

As seen in FIGS. 22 and 23, the model in the damage display will change appearance, e.g., colors, based on the DIS damage level of the most damaged part of each component or piece of the aircraft model. For example, a gray/while color may indicate no damage, green may represent a damage level of 1 (light damage), yellow both damage levels 2 (moderate damage) and level 3 (heavy damage), and red may represent level 4 (destroyed).

EXAMPLE

As seen in FIGS. 22 and 23, the damage of the target plane is superimposed in the visualization in such a way that it becomes immediately apparent what part is being hit and what was previously damaged.

Figure 24:
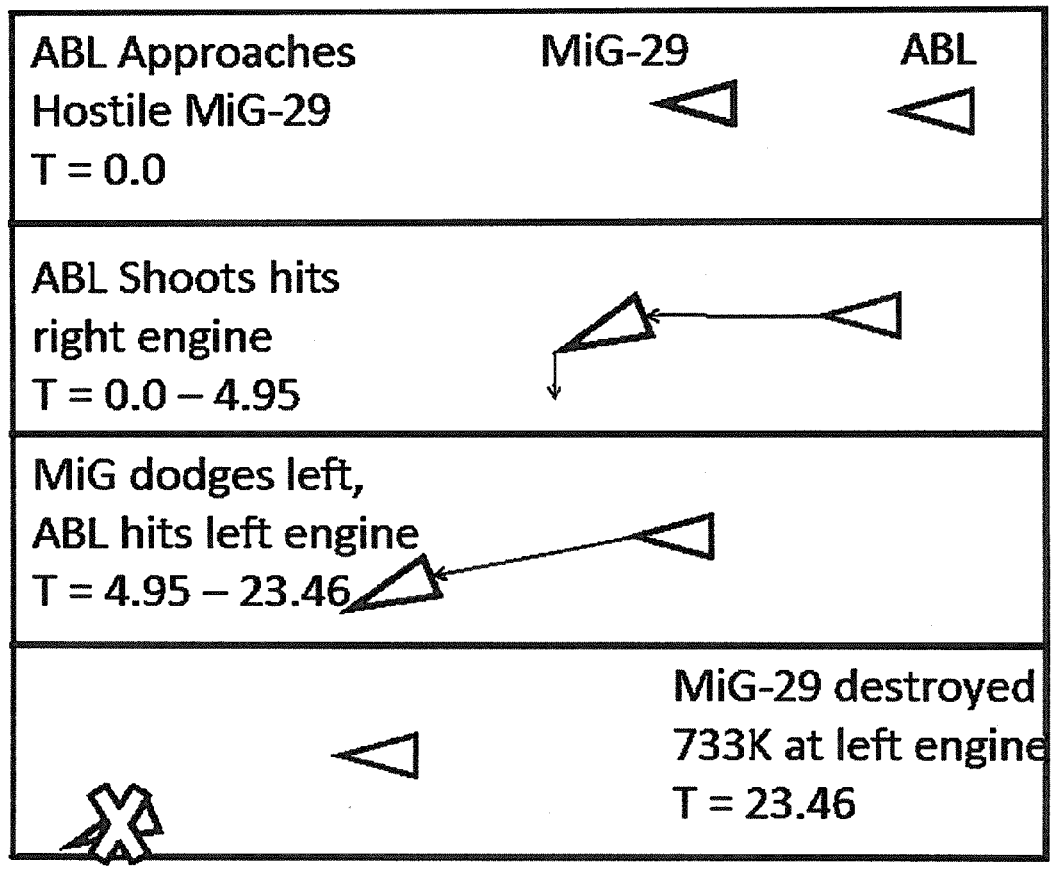
FIG. 24 is an illustration of the exemplary engagement with a MiG-29 aircraft that is destroyed using a directed energy weapon.

In the scenario shown in FIG. 24, the MiG-29 took a slight left action preventing the ABL's laser from staying completely on target. Referring to FIG. 23, at the outset of the encounter, the ABL managed to score approximately 5 seconds worth of dwell time on the right engine and heat one piece over 80 degrees. The particular piece that was heated 85 degrees took a total of 3.40 seconds of laser time and is located at <0.00, −1.02, 0.0> in entity coordinates. After striking the right engine for 5 seconds, the laser was forced onto the left engine where it quickly found a spot it could stick on <0.12, 0.49, 0.0> for 17.39 seconds and deliver the threshold amount of heat, 733° K, to destroy that part.

It is noteworthy that FIG. 22 and FIG. 23 are from different test runs of the system. FIG. 24 is an illustration of what is occurring in the encounter seen in FIG. 23, as the plane dodges the ABL, and the point of heating moves along its airframe.

During this encounter, PBEG sends XCITE, at 30 Hz, the status of all of the pieces involved in this DE encounter. PBEG sends back to XCITE the DIS component ID, damage level, temperature, diameter of affected area, smoke color, visual, and the location of the hit. This information satisfies the requirements of the DIS Entity Damage Status PDU, which XCITE then sends out for each PBEG damage update it receives.

In this particular scenario, the MiG-29 made a slight left after about 5 seconds of the ABL hitting his right engine. The geometry of the turn moved the right engine farther from the ABL, which was aiming for the center of the plane, and forced hits on the left engine. The ABL took a full 17 seconds on some part of the left engine to force it to overheat and fail. This resulted in a successful MiG-29 kill. Total encounter time was just shy of 24 seconds, due to the beam moving around.

An important aspect of the present invention is that it enables XCITE to offload calculations onto physics processing engines equipped with PBEG, which can significantly increase fidelity without sacrificing the real-time demands that are placed on XCITE. The sub-component accuracy of this system is unrivaled in the DIS domain and allows for complex aiming algorithms to be tested and applied to simulation solutions without impacting the real-time nature of such systems.

Another important aspect of this invention is the decoupling of the model and system in such a way that each piece can have completely different coefficients and thresholds, and the PBEG dynamically reads these in from the model, removing the need to have anyone but an artist add new models or increase the fidelity. With accurate models and the aero model PBEG can effectively remove any DIS jitter in the system and provide frame by frame accurate assessments from continuous damage weapon systems including DE weapons.

Formulation of the system of the invention from the COTS software required that XCITE be modified to support the transferring of a DE encounter with PBEG. These modifications included adding the capability of storing the PBEG hosts array that is consulted when a DE encounter begins. This is the set of specific PBEG stations in the overall PBEG system that will accommodate the processing of the DE weapons fire or missile engagement. If no PBEG is present, XCITE manages all of the directed energy calculations itself. At the onset of a DE encounter, XCITE is modified to output a DE handoff request, and to which PBEG replies with confirmation.

Upon a proper computerized communications handshake with PBEG, XCITE has been modified to accept incoming Set Data PDUs representing damage to the aircraft determined by PBEG after a DE fire or a missile detonation, and to store the incoming data internally. After receiving the data, XCITE reflects the damage back as properly formatted Entity Damage State PDUs, which are defined in DIS 1278.1 200X Draft 14.

The PBEG system was modified to transfer the computational load on the XCITE computer to PBEG and offloading it to the physics engine(s) for calculations. PBEG is configured to accept the DE Handoff Request from XCITE and immediately begin calculating the damage, which is uploaded back to XCITE. PBEG is also configured to accept different models and heating coefficients, making it a versatile heat calculation system.

The PBEG is also set up to output heat results in three different modes depending on the desired format. It can output the real component IDs, the component IDs XCITE expects, or optionally run in standalone mode and not output damage, only displaying it locally instead.

The provision in this invention of a framework in which DE or missile encounters can be accurately modeled offers the possibility of easily increasing the fidelity and versatility of the system.

Enhancement of the beam target locations may be added to the system here disclosed, in which the beam is typically aimed at the center point of the aircraft and it does not deviate. The targeting algorithm may be enhanced with real time feedback of the aircraft's state or by some other means to focus the targeting on parts of an object aircraft or vehicle.

Additionally, because PBEG has an exact smoothed position for the plane and is already doing the thermal algorithm, it provides an ideal platform in which to locate the beam control algorithm.

Also, the linearized heat transfer algorithm used does not address some of the complicated thermal interactions that occur when a megawatt class laser is shot through the atmosphere and strikes a metallic object. Enhanced modeling of atmospheric losses, and the behavior of the superheated air around the beam target location may be provided to yield better accuracy.

The nature of damage information exchange and interactions between PBEG and XCITE may be enhanced as well. XCITE has some damage and partial damage capabilities that may be used more fully, as well as improvements in the way PBEG handles damage states. With more accurate damage assessments, more accurate modeling may be afforded for what happens when certain subcomponents suffer partial damage.

Finally, with XCITE's ability to interface to multiple PBEGs, additional capability can be added to the system by distributing DE/missile encounters across more or all of the PBEG stations. As in the case of one target and two shooters, two different PBEGs can calculate the damage from each of the beams and collaborate when the beams are close or affect areas the other PBEG is managing. This may be scalable to allow many hundreds of DE encounters to occur simultaneously. Also, each PBEG may be configured to continue taking encounters until it is almost computationally overloaded, thus further improving entity counts as well as fidelity.

The terms herein should be read as terms of description rather than of limitation, as those with this disclosure before them will be able to make changes and modifications therein without departing from the spirit of the invention.

What is claimed is:

1. A method for providing a computerized interactive simulation to a user at a simulation station communicating over a network, said method comprising:
    providing a computerized simulation of operation of the vehicle in a simulated environment;
    providing a computerized simulation of a weapon operating in the simulated environment;
    making a determination in said computerized simulation of an engagement of the weapon with the vehicle in the simulated environment;
    responsive to the determination of the engagement of the weapon, performing a computerized interaction modeling of the weapon with a model of the vehicle;
    determining as a result of said modeling interaction a damage model of the vehicle;
    simulating operation of said vehicle based on said damage model,
    wherein the computerized simulation of the vehicle includes
    storing physics data on a computer accessible memory coupled with a physics engine associated with the simulation station, said physics data defining physics parameters of a plurality of virtual objects in the simulated environment, and
    determining a position of the vehicle in said simulated environment with said physics engine based on the physics data,
    wherein the model of the vehicle further includes data defining a plurality of constituent parts of the vehicle, and the computerized interaction modeling includes a determination of the damage model includes determining for each part a damage data value,
    wherein the computerized simulation of the weapon is a simulation of a directed energy weapon, and
    the computerized interaction modeling includes determining a temperature of any part of the model that is exposed in the simulation to a directed energy beam hit the directed energy weapon,
    said temperature being determined using the physics engine of the simulation station or another physics engine by providing said physics engine with data corresponding to a mechanical analogue of the directed energy beam hit.

2. The method according to claim 1 wherein and further comprising determining destruction of said part if the temperature exceeds a predetermined maximum temperature.

3. The method according to claim 1, wherein the temperature is based on a recorded series of simulated directed energy beam hits, and the modeling includes modeling heating of the part during each of the beam hits and cooling of the part after each of the beam hits.

4. A system for distributed simulation of aircraft in combat, said system comprising:
    a plurality of simulation stations for respective users connected via a network, each of simulation station having a respective physics engine and data storage storing scene data defining a version of a shared simulation environment containing virtual entities, including, a respective aircraft associated with each simulation station, and in which positions of the virtual entities are determined by the physics engine applying physics rules;
    said simulation stations each including a display visible to the user and an image generator rendering from the scene data a sequence of frames of out-the-window video displayed thereon in real time;
    a simulation administration computer system storing data corresponding to authoritative positions of entities in the simulation environment; and
    a physics station connected with the network and comprising a physics engine;
    the simulation administration computer system transmitting physics data units of said authoritative states for said entities over the network to the simulation stations;
    said simulation stations each receiving said physics data units and deriving force data values therefrom that are applied to the respective physics engine so as to cause the entities in the respective scene data to each move toward the respective authoritative state according to the physics rules;
    said simulation administration computer system administering simulation of one or more weapon systems, and, when the weapon system is fired, said simulation system determining if there is a weapon system engagement with any of the aircraft, and, responsive to a determination of an engagement, the simulation administration computer system executes a handoff of control of the authoritative position of said aircraft to the physics station, such that the physics station determines the authoritative position of the aircraft for the system;
    said physics system accessing data defining a target model of the aircraft responsive to said handoff and performing a weapon interaction modeling of the engagement;
    said target model data including data defining a plurality of pieces of the aircraft that are fixedly connected with each other in the simulation, each piece having a respective maximum damage value, and each piece being composed of a plurality of subsidiary parts connected together in the model, said parts each being a primitive planar facet of a wireframe of the aircraft model;

said physics station performing the weapon interaction modeling using a ray-casting or ray-tracing function of the physics engine thereof so as to identify parts subject to damage, and determining for each piece a total damage of all parts thereof and a damage level data value indicative of a degree of damage experienced by the piece;

said physics station determining from all of the damage level data values for all of the pieces, aircraft damage data indicating that the aircraft that is either undamaged, destroyed or partially damaged, and if partially damaged, identifying the pieces that are damaged;

said physics system transmitting said aircraft damage data to said simulation administration computer system, wherein the aircraft damage data is used to modify the authoritative state data of the aircraft if the aircraft is destroyed or partially damaged, wherein the weapon system simulated is a directed energy weapon, and wherein the weapon interaction modeling includes determining a temperature of any part of the model that is exposed in the simulation to a directed energy beam hit from the directed energy weapon, said determining of temperature including thermal modeling heating and cooling of the part during a period of time starting with firing of the directed energy weapon, the thermal modeling using the physics engine of the simulation station or another physics engine to calculate the temperature of the part by providing said physics engine with data corresponding to a mechanical analogue of the directed energy beam hit, and determining destruction of said part if the temperature exceeds a predetermined maximum temperature.

5. The system according to claim 4, wherein the mechanical analogue is a physics-based model of a box of specified weight being pushed by a specified force on a surface having a specified friction, wherein the specified force is defined by a value determined as a heat flux of the directed beam hit in the simulation.

6. A method of operating a physics-based simulation system for simulating a vehicle and a weapon system, said system having first and second computerized stations connect via a network, each of said stations including a respective physics engine, said method comprising the steps of:

modeling at the first computerized station operation of the vehicle using a vehicle model and transmitting entity state data for said vehicle over the network as a master synchronizer therefor;

modeling at the second computerized station operation of the weapons system using a vehicle model and transmitting authoritative entity state data for said weapons system over the network as a master synchronizer therefor;

responsive to a determination of firing of the weapon, assigning one of the computerized stations or a third computerized station having a respective physics engine as master synchronizer for both the vehicle and the weapon;

modeling using the physics engine at said assigned computerized station engagement of the weapon with the vehicle using a damage assessment model of the vehicle so as to produce a damage status report data; and modeling at the first computerized station subsequent operation of the vehicle using the vehicle model or a version thereof reflecting damage defined by the damage assessment data, wherein the damage assessment model is of a vehicle made up of parts each having with damage limits, and the resolving of the said damage status report is based on a comparison of damage from the weapon with said damage limit, wherein the weapon is modeled as a directed energy weapon, and an effect of a beam hit by the directed energy weapon on one or more of the parts of the damage assessment model is determined using the physics engine to model heating and cooling of the part or parts using a mechanical analogue model that emulates the effect of the beam.

* * * * *